United States Patent
Higashi et al.

(10) Patent No.: US 8,269,928 B2
(45) Date of Patent: Sep. 18, 2012

(54) POLARIZING PLATE, LIQUID CRYSTAL PANEL, AND LIQUID CRYSTAL DISPLAY

(75) Inventors: Masatsugu Higashi, Ibaraki (JP); Takashi Kumano, Ibaraki (JP); Kazuki Uwada, Ibaraki (JP); Nao Murakami, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 407 days.

(21) Appl. No.: 12/755,679

(22) Filed: Apr. 7, 2010

(65) Prior Publication Data

US 2010/0253892 A1    Oct. 7, 2010

(30) Foreign Application Priority Data

Apr. 7, 2009    (JP) .................................. 2009-093479

(51) Int. Cl.
*G02F 1/1335* (2006.01)
(52) U.S. Cl. ........................... 349/118; 349/96; 349/117
(58) Field of Classification Search .................. None
See application file for complete search history.

(56) References Cited

U.S. PATENT DOCUMENTS

| | | | |
|---|---|---|---|
| 4,889,412 A | 12/1989 | Clerc et al. | |
| 5,298,199 A | 3/1994 | Hirose et al. | |
| 5,344,916 A | 9/1994 | Harris et al. | |
| 6,503,581 B1 | 1/2003 | Shibue et al. | |
| 6,661,488 B1 | 12/2003 | Takeda et al. | |
| 2003/0001988 A1 | 1/2003 | Maeda et al. | |
| 2005/0030456 A1 | 2/2005 | Murakami et al. | |
| 2007/0002233 A1* | 1/2007 | Yano et al. .................... 349/117 |
| 2009/0002616 A1 | 1/2009 | Shibue et al. | |
| 2009/0116109 A1 | 5/2009 | Konishi et al. | |
| 2009/0135345 A1* | 5/2009 | Yajima et al. .................... 349/96 |
| 2009/0207360 A1 | 8/2009 | Takeda et al. | |
| 2009/0279031 A1 | 11/2009 | Kitagawa et al. | |
| 2010/0110347 A1 | 5/2010 | Kitagawa et al. | |
| 2010/0277675 A1 | 11/2010 | Higashi et al. | |

FOREIGN PATENT DOCUMENTS

| | | |
|---|---|---|
| CN | 1623107 A | 6/2005 |
| JP | 61-292601 A | 12/1986 |
| JP | 62-210423 A | 9/1987 |
| JP | 04-153621 A | 5/1992 |

(Continued)

OTHER PUBLICATIONS

Korean Office Action dated Sep. 26, 2011, issued in corresponding Korean Patent Application No. 10-2010-0029347.(w/partial translation).

(Continued)

*Primary Examiner* — Tina Wong
(74) *Attorney, Agent, or Firm* — Westerman, Hattori, Daniels & Adrian, LLP

(57) ABSTRACT

The present invention provides a polarizing plate that includes: a transparent protective film; a polarizer; and an optical compensation layer. The transparent protective film, the polarizer, and the optical compensation layer are laminated in this order. A moisture percentage of the polarizing plate is 2.8% by mass or less. The optical compensation layer includes a retardation film. The retardation film includes at least one resin selected from the group consisting of norbornene resins, cellulose resins, polyvinyl acetal resins, polyimide resins, polyester resins, and polycarbonate resins. The optical compensation layer shows an optical property represented by the following formula (I):

$$nx > ny > nz \qquad (I).$$

18 Claims, 5 Drawing Sheets

FOREIGN PATENT DOCUMENTS

| | | |
|---|---|---|
| JP | 11-116780 A | 4/1999 |
| JP | 11-258605 A | 9/1999 |
| JP | 2000-315144 A | 11/2000 |
| JP | 2001-188128 A | 7/2001 |
| JP | 2001-350017 A | 12/2001 |
| JP | 2004-46065 A | 2/2004 |
| JP | 2005-314534 A | 11/2005 |
| JP | 2006-023573 A | 1/2006 |
| JP | 2007-161994 A | 6/2007 |
| JP | 3984277 B2 | 10/2007 |
| JP | 2009-053653 A | 3/2009 |
| KR | 10-2002-0088052 A | 11/2002 |
| KR | 10-2008-0023751 A | 3/2008 |

OTHER PUBLICATIONS

Chinese Office Action dated Oct. 10, 2011, issued in corresponding Chinese Patent Application No. 201010158607.4.(w/partial translation).

* cited by examiner

POLARIZING PLATE, LIQUID CRYSTAL PANEL, AND LIQUID CRYSTAL DISPLAY

CROSS-REFERENCE TO RELATED APPLICATION

This application claims priority from Japanese Patent Application No. 2009-093479 filed on Apr. 7, 2009. The entire subject matter of the Japanese Patent Application is incorporated herein by reference.

BACKGROUND OF THE INVENTION

1. Field of the Invention

The present invention relates to a polarizing plate, a liquid crystal panel, and a liquid crystal display.

2. Description of Related Art

A liquid crystal display (LCD) is a device displaying letters and images using electrooptic properties of liquid crystal molecules. The LCD is widely used in mobile phones, notebook PCs, liquid crystal display TVs, and the like.

A liquid crystal cell used for an LCD is normally used in a state where a polarizing plate is arranged on the one side thereof or polarizing plates are arranged on the both sides thereof. An example of the structure of the liquid crystal cell is shown in a schematic cross sectional view of FIG. 4. As shown in FIG. 4, in a liquid crystal cell 41, spacers 412 are arranged between a pair of substrates 411. A space is formed between the pair of substrates 411 with the spacers 412. In the space, a liquid crystal layer 413 is interposed between the pair of substrates 411. On one of the substrates of such a liquid crystal cell, for example, a switching element (e.g. TFT), a scanning line, and a signaling line are provided. The switching element controls electrooptic properties of liquid crystal molecules, the scanning line sends a gate signal to the switching element, and the signaling line sends a source signal to the switching element.

One of the properties required for a liquid crystal display is less occurrence of light leak at the time of a black display. As a drive mode of a liquid crystal cell for an LCD that is superior in this property, a vertical alignment (VA) mode is known (for example, see JP2004-46065 A). This VA mode liquid crystal cell has an alignment in which liquid crystal molecules are substantially perpendicular to the surface of the substrate in a state of unactuated. Therefore, light passes through a liquid crystal layer with very little change in a polarization plane thereof. Thus, the VA mode liquid crystal cell less likely causes a light leak in a state of unactuated, and the liquid crystal cell can provide an almost perfect black display.

However, as definition of LCDs (e.g. liquid crystal display TVs) is increasing in these years, black brightness in a plane of a liquid crystal panel is required to be reduced. As the black brightness decreases, if even just a little bit of light is leaked from a polarizing plate, a brightness irregularity may easily become noticeable. Therefore, leak of even just a little bit of light from the polarizing plate becomes a problem.

SUMMARY OF THE INVENTION

Therefore, with the foregoing in mind, it is an object of the present invention to provide a polarizing plate that keeps the light leak therefrom at a low level and prevents occurrence of even just a little bit of brightness irregularity. Another object of the present invention is to provide a liquid crystal panel and a liquid crystal display using the polarizing plate.

In order to achieve the aforementioned object, the polarizing plate of the present invention is a polarizing plate that includes: a transparent protective film; a polarizer; and an optical compensation layer. The transparent protective film, the polarizer, and the optical compensation layer are laminated in this order. A moisture percentage of the polarizing plate is 2.8% by mass or less. The optical compensation layer includes a retardation film. The retardation film contains at least one resin selected from the group consisting of norbornene resins, cellulose resins, polyvinyl acetal resins, polyimide resins, polyester resins, and polycarbonate resins. The optical compensation layer shows an optical property represented by the following formula (I):

$$nx > ny > nz \quad (I)$$

where in the formula (I), nx, ny, and nz show refractive indices in an X-axis direction, a Y-axis direction, and a Z-axis direction, respectively, in the optical compensation layer. The X-axis direction is an axial direction that shows a maximum refractive index in a plane of the optical compensation layer, the Y-axis direction is an axial direction that is perpendicular to the X-axis direction in the plane. The Z-axis direction is a thickness direction that is perpendicular to the X-axis direction and the Y-axis direction.

The liquid crystal panel of the present invention is a liquid crystal panel that includes: a liquid crystal cell; and a polarizing plate of the present invention. The polarizing plate is arranged on at least one side of the liquid crystal cell.

Further, the liquid crystal display of the present invention is a liquid crystal display that includes a polarizing plate of the present invention or a liquid crystal panel of the present invention.

The inventors of the present invention conducted earnest studies on the cause of the light leak and the brightness irregularity in a polarizing plate. As a result, the inventors focused their attention on the relation between a water amount of a polarizer and a light leak, and thereby reached the present invention. The polarizing plate of the present invention can suppress the light leak by setting its moisture percentage at 2.8% by mass or less. Although this mechanism is not always clear, for example, it can be presumed as follows. When a water amount of a polarizer is large, a strain occurs in a polarizing plate due to heat (for example, about 40° C.) caused by, for example, lighting a backlight. Subsequently, due to the strain, a gap occurs in an absorption axis of a polarizer or a slow axis change and a retardation change occur in an optical compensation layer. Thereby, uniformity of a display property of a polarizing plate is decreased and the brightness irregularity is caused. In contrast, it is considered that the strain of a polarizing plate due to heat caused by, for example, lighting a backlight is decreased when the moisture percentage of the polarizing plate of the present invention is set at 2.8% by mass or less. It is presumed that, as this strain decreases, a gap in an absorption axis of a polarizer, a slow axis change of an optical compensation layer, and a retardation change of an optical compensation layer are decreased, and thereby the light leak and the brightness irregularity can be suppressed. The reason why a strain occurs in a polarizing plate when the moisture percentage of the polarizing plate is high is also not clear. It is considered that the cause of the strain is related in some way to the fact that the moisture permeability of the transparent protective film is different from that of the optical compensation layer, for example. However, these are one of the presumable mechanisms and do not limit the present invention at all.

DETAILED DESCRIPTION OF THE INVENTION

Figure 1:
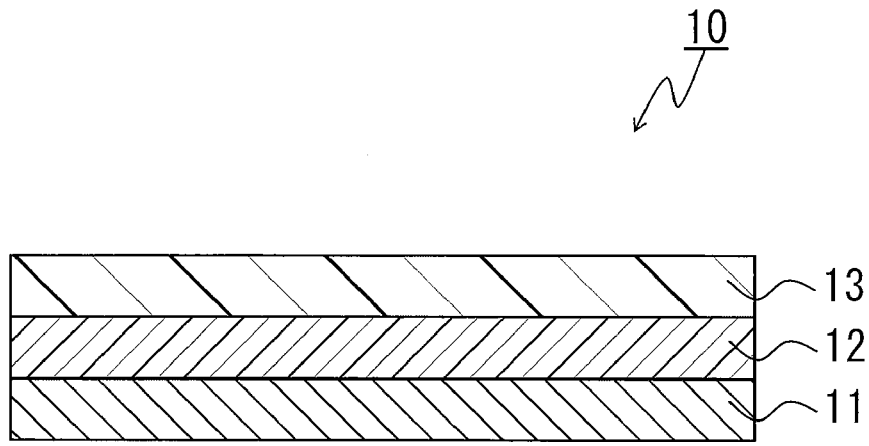
FIG. 1 is a schematic cross sectional view showing an example of the structure of the polarizing plate of the present invention.

In the polarizing plate of the present invention, for example, the Nz coefficient of the optical compensation layer represented by the following formula (II) is preferably 1.5 or more at the wavelength of $\lambda=590$ nm.

$$Nz=(nx-nz)/(nx-ny) \tag{II}$$

where in the formula (II), nx, ny, and nz are the same as in the formula (I). The Nz coefficient is more preferably 2 or more at the wavelength of $\lambda=590$ nm. The upper limit of the Nz coefficient is not particularly limited. The upper limit of the of the Nz coefficient may be, for example, 10 or less, preferably 8 or less, and more preferably 7 or less at the wavelength of $\lambda=590$ nm. It is to be noted that, in the present invention, when the scope of the invention is defined by a numeric value, the scope of the invention may be defined strictly by the range of the numeric value or the scope of the invention may be defined approximately by the range of the numeric value. For example, the moisture percentage of "2.8% by mass or less" may be strictly 2.8% by mass or less or may be approximately 2.8% by mass or less. Further, for example, the thickness of the film of "20 μm to 200 μm" may be strictly 20 μm to 200 μm or may be approximately 20 μm to 200 μm.

The transparent protective film is preferably a triacetyl cellulose film, although it is not particularly limited.

Preferably, after conducting a heat treatment to the polarizing plate at 50° C.±3° C. for 120 minutes, the strain ϵ of the polarizing plate represented by the following formula (III) in a direction of an absorption axis of the polarizer is $400\times10^{-6}$ or less and the strain ϵ of the polarizing plate in a direction perpendicular to the absorption axis in a plane of the polarizing plate is $800\times10^{-6}$ or less.

$$\epsilon=\Delta L/L \tag{III}$$

where in the formula (III), L is a dimension (mm) in a measurement direction of the strain of the polarizing plate before the heat treatment. ΔL is an absolute value of an amount of the change in the dimension (mm) in the measurement direction of the strain before and after the heat treatment. The strain ϵ of the polarizing plate in the direction of the absorption axis of the polarizer is more preferably $370\times10^{-6}$ or less, further preferably $270\times10^{-6}$ or less, and particularly preferably $250\times10^{-6}$ or less. The strain ϵ of the polarizing plate in a direction perpendicular to the absorption axis in the plane of the polarizing plate is more preferably $700\times10^{-6}$ or less, further preferably $620\times10^{-6}$ or less, and particularly preferably $600\times10^{-6}$ or less. It is to be noted that, when a polarizer is produced by a producing method including a stretching step of a film, normally, an absorption axis appears in a stretching direction. In such a case, a direction of an absorption axis of a polarizer is sometimes referred to as "MD direction" and a direction perpendicular to the absorption axis in a plane is sometimes referred to as "TD direction".

In the liquid crystal panel of the present invention, the liquid crystal cell is preferably a VA mode liquid crystal cell. Further, in the liquid crystal panel of the present invention, the polarizing plate of the present invention is preferably arranged on at least the back side of a visible side of the liquid crystal cell. Moreover, in the polarizing plate of the present invention arranged on the back side of the visible side of the liquid crystal cell, the optical compensation layer is preferably arranged on the liquid crystal cell side.

For example, the liquid crystal display of the present invention preferably includes the liquid crystal panel of the present invention in which the polarizing plate of the present invention is arranged on at least the back side of the visible side of the liquid crystal cell, and further includes a backlight arranged on the back side of the visible side of the liquid crystal cell.

Hereinafter, the polarizing plate, the liquid crystal panel, and the liquid crystal display of the present invention are described in detail.

<A. Definition, Etc.>

In the present invention, a moisture percentage (% by mass) of a polarizing plate is, for example, a value measured by a method described in Examples described later.

In the present invention, refractive indices, nx, ny, and nz, are as defined in the formula (I).

In the present invention, a retardation value Re [λ] in a plane of a layer is, for example, an in-plane retardation value calculated by the formula "Re [λ]=(nx−ny)×d" at a wavelength of λ (nm) at 23° C. In the aforementioned formula, d represents a thickness (nm) of a layer.

In the present invention, a retardation value Rth [λ] in a thickness direction of a layer is, for example, a retardation value calculated by the formula "Rth [λ]=(nx−nz)×d" at a wavelength of λ (nm) at 23° C. In the aforementioned formula, d represents a thickness (nm) of a layer.

In the present invention, a birefringence ($\Delta n_{xz}$ [λ]) in a thickness direction of a layer is, for example, a value calculated by the formula "$\Delta n_{xz}$ [λ]=Rth [λ]/d". In the aforementioned formula, d represents a thickness (nm) of a layer.

In the present invention, an Nz coefficient is as defined in the formula (II), and an Nz coefficient at a wavelength of λ is a value calculated by the formula "Nz coefficient=Rth [λ]/Re [λ]". The λ may be, for example, 590 nm.

In the present invention, "nx=ny" includes not only a case in which nx completely matches ny but also a case in which nx is substantially the same as ny. Likewise, "ny=nz" includes not only a case in which ny completely matches nz but also a case in which ny is substantially the same as nz. Therefore, for example, the description "nx=ny" includes, for example, a case where Re [590] is less than 10 nm.

In the present invention, "orthogonal" includes a case of substantially orthogonal. The "substantially orthogonal" is, for example, in the range of 90±2° and preferably in the range of 90±1°. Further, in the present invention, "parallel" includes a case of substantially parallel. The "substantially parallel" is, for example, in the range of 0±2° and preferably in the range of 0±1°.

In the present invention, a transmittance (T) of a polarizing plate is a Y value that is obtained by conducting a luminous correction by a visual field of 2 degrees (C light source) defined in JIS Z 8701 (1982 version).

<B. Polarizing Plate>
<B-1. Whole Structure of Polarizing Plate of Present Invention>

A schematic cross sectional view of FIG. 1 shows an example of the structure of the polarizing plate of the present invention. In FIG. 1, in order to make it clearly understandable, for example, the sizes and ratios of respective components differ from actual ones. As shown in FIG. 1, a polarizing plate includes a transparent protective film 11, a polarizer 12, and an optical compensation layer 13. The polarizing plate 10 is constructed by laminating the transparent protective film 11, the polarizer 12, and the optical compensation layer 13 in this order. The moisture percentage of the polarizing plate 10 is 2.8% by mass or less. Therefore, in the polarizing plate 10, a strain due to heat caused by, for example, lighting a backlight is suppressed. As a result, in the polarizing plate 10, occurrence of brightness irregularity due to the strain is prevented. The moisture percentage of the polarizing plate is preferably 2.5% by mass or less, more preferably 2.3% by mass or less, and particularly preferably 2.0% by mass or less.

With respect to the polarizing plate of the present invention, an adhesive layer (not shown) or an other optical member (preferably the one showing isotropy) may be arranged between each component (optical member). As the other optical member, for example, another transparent protective film may be provided between the polarizer and the optical compensation layer. The "adhesive layer" is one obtained by bonding surfaces of adjacent optical members and combining them with practically sufficient adhesive force and adhesive time. Examples of the material for forming the adhesive layer include conventionally known adhesive agents, pressure-sensitive adhesive agents, anchor coating agents, and the like. The adhesive layer may have a multilayer structure in which an anchor coating layer is formed on a surface of an adhesive body and an adhesive agent layer is formed thereon. Alternatively, the adhesive layer may be a thin layer (also called a hair-line) that is hardly acknowledged by the naked eyes.

The thickness of the whole polarizing plate of the present invention is, for example, in the range from 20 μm to 300 μm, although it is not particularly limited. By setting the thickness in the aforementioned range, the polarizing plate that is superior in a mechanical strength can be obtained.

Further, when the polarizing plate of the present invention is used for a liquid crystal display, for example, the black brightness ratio of the polarizing plate is preferably 2.0 or less. The black brightness ratio is more preferably 1.9 or less, yet more preferably 1.8 or less, still more preferably 1.5 or less, particularly preferably 1.3 or less, and ideally 1.0. The black brightness ratio can be measured by a method described in Examples described later.

<B-2. Transparent Protective Film>

The transparent protective film is preferably a non-color film, although it is not particularly limited. The in-plane retardation value Re [550] of the transparent protective film at the wavelength of 550 nm is, for example, in the range from 0 nm to 10 nm, preferably in the range from 0 nm to 6 nm, and further preferably in the range from 0 nm to 3 nm. The retardation value Rth [550] of the transparent protective film in the thickness direction at the wavelength of 550 nm is, for example, in the range from 0 nm to 20 nm, preferably in the range from 0 nm to 10 nm, more preferably in the range from 0 nm to 6 nm, and further preferably in the range from 0 nm to 3 nm.

The thickness of the transparent protective film is not particularly limited, however is, for example, in the range from 20 μm to 200 μm, preferably in the range from 30 μm to 100 μm, and more preferably in the range from 35 μm to 95 μm.

As the transparent protective film, for example, a cellulose film is used. With respect to a cellulose film that is generally used as a protective film, in a case of a triacetyl cellulose (TAC) film, with the thickness of 40 μm, the retardation value (Rth) in the thickness direction is about 40 nm, which is large. An appropriate treatment is preferably applied to a cellulose film having a large retardation value (Rth) in the thickness direction for reducing the retardation value (Rth) in the thickness direction.

Any appropriate treatments can be employed as the treatment for reducing the retardation value (Rth) in the thickness direction. An example of the treatment is that, a solvent such as cyclopentanone, methyl ethyl ketone, or the like is applied to a base film such as polyethylene terephthalate (PET), polypropylene, stainless, or the like, the base film is affixed on a common cellulose film and then dried by heating (for example, at 80° C. to 150° C. for 3 to 10 minutes), and thereafter the base film is separated from the cellulose film. Another example of the treatment is that a norbornene resin, an acrylic resin, or the like is dissolved in a solvent such as cyclopentanone, methyl ethyl ketone, or the like, the solvent is applied to a common cellulose film and then dried by heating (for example, at 80° C. to 150° C. for 3 to 10 minutes) to prepare a coated film, and thereafter the coated film is separated from the cellulose film.

The material for forming the cellulose film is preferably an aliphatic substituted cellulose polymer such as diacetyl cellulose, TAC, or the like. Commonly used TAC has an acetate substitution degree of about 2.8. Preferably, by controlling the acetate substitution degree of the TAC in the range from 1.8 to 2.7, more preferably by controlling a propionate substitution degree in the range from 0.1 to 1, the retardation value (Rth) in the thickness direction can be kept at a low level.

Technologies for keeping the retardation value (Rth) in the thickness direction at a low level as described above may be appropriately used in combination.

Another preferable example of the film that satisfies the aforementioned optical property (in-plane retardation value Re [550] and thickness direction retardation value Rth [550]) includes an acrylic resin film. The acrylic resin film is preferably an acrylic resin film described in JP 2005-314534A that contains an acrylic resin (A) containing a glutaric anhydride unit represented by the following structural formula (1) as a main component. Since the acrylic resin film includes the glutaric anhydride unit represented by the following structural formula (1), the heat resistance thereof can be increased. In the following structural formula (1), $R^1$ and $R^2$ each represent a hydrogen atom or an alkyl group having 1 to 5 carbon atoms. $R^1$ and $R^2$ may be identical to or different from each other. $R^1$ and $R^2$ are preferably hydrogen atoms or methyl groups, and preferably methyl groups.

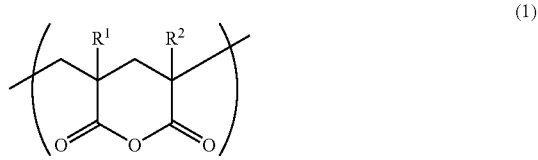

(1)

In the acrylic resin (A), the content ratio of the glutaric anhydride unit represented by the structural formula (1) is preferably in the range from 20% by mass to 40% by mass, and more preferably in the range from 25% by mass to 35% by mass.

The acrylic resin (A) may include one of or more than one of any appropriate monomer units besides the glutaric anhydride unit represented by the structural formula (1). A preferable example of such a monomer unit includes a unit of alkyl ester of a vinyl carboxylic acid. In the acrylic resin (A), the content ratio of the unit of alkyl ester of a vinyl carboxylic acid is preferably in the range from 60% by mass to 80% by mass, and more preferably in the range from 65% by mass to 75% by mass.

As the unit of alkyl ester of a vinyl carboxylic acid, a unit represented by the general formula (2) can be used. In the general formula (2), $R^3$ represents a hydrogen atom or an aliphatic or alicyclic hydrocarbon having 1 to 5 carbon atoms, and $R^4$ represents an aliphatic hydrocarbon having 1 to 5 carbon atoms.

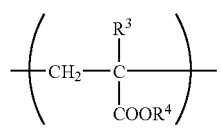

(2)

The weight-average molecular weight of the acrylic resin (A) is preferably in the range from 80000 to 150000.

The content ratio of the acrylic resin (A) in the acrylic resin film is preferably in the range from 60% by mass to 90% by mass.

The acrylic resin film may include one of or more than one of any appropriate components besides the acrylic resin (A). As for such components, any appropriate components can be employed within a range in which the advantages of the present invention are not impaired. Examples of the components include resins other than the acrylic resin (A), ultraviolet absorbers, antioxidants, lubricants, plasticizers, mold lubricants, stain inhibitors, flame retardants, nucleating agents, antistatic agents, pigments, coloring agents, and the like.

The transparent protective film may include a surface-treated layer on the side that is opposed to the side where the polarizer is provided. Appropriate treatments can be suitably employed as the surface treatment depending on the intended use. Examples of the surface-treated layer include layers treated with a hard coating treatment, an antistatic treatment, an antireflection treatment, a diffusion treatment (i.e., anti-glare treatment), and the like. These surface treatments are conducted with the aim of preventing a screen from getting dirty and damaging. Further, these surface treatments are conducted with the aim of preventing the damage of viewability of a display screen caused by a room fluorescent lamp and sunlight reflected in the screen. As for the surface-treated layer, generally, one in which a treatment agent for forming the surface-treated layer is adhered on a surface of a base film is used. The base film may also serve as the transparent protective film. Further, for example, the surface-treated layer may have a multilayer structure in which a hard coating layer is laminated on an antistatic treatment layer.

For example, a commercially available surface-treated polymer film can be directly used as the transparent protective film. Alternatively, the commercially available polymer film can be applied with a surface treatment and then used as the transparent protective film. Examples of the commercially available film applied with the diffusion treatment (anti-glare treatment) include "AG150", AGS1", and "AGS2" (product names) produced by Nitto Denko Corporation, and the like. Examples of the commercially available film applied with the antireflection treatment include "ARS" and "ARC" (product names) produced by Nitto Denko Corporation, and the like. Examples of the commercially available film applied with the hard coating treatment and the antistatic treatment include "KC8UX-HA" (product name) produced by Konica Minolta Opto, Inc., and the like. Examples of the commercially available film applied with the antireflection treatment include "ReaLook" series (product name) produced by NOF Corporation, and the like.

<B-3. Polarizer>

The polarizer is not particularly limited. For example, the polarizer can be obtained by stretching a polymer film that contains an iodine-containing polyvinyl alcohol resin. The content of iodine of the polarizer is not restricted. Preferably, the polarizer further contains potassium. The content of the potassium is, for example, in the range from 0.2% by mass to 1.0% by mass, preferably in the range from 0.3% by mass to 0.9% by mass, and further preferably in the range from 0.4% by mass to 0.8% by mass. Preferably, the polarizer further contains boron. The content of the boron is, for example, in the range from 0.5% by mass to 3.0% by mass, preferably in the range from 1.0% by mass to 2.8% by mass, and further preferably in the range from 1.5% by mass to 2.6% by mass.

The polyvinyl alcohol resin can be obtained, for example, by saponifying a vinylester polymer that is obtained by polymerizing vinylester monomers. The saponification degree of the polyvinyl alcohol resin is in the range from 95.0 mol % to 99.9 mol %. By using the polyvinyl alcohol resin having the saponification degree in the aforementioned range, a polarizer that is further superior in durability can be obtained. As the average degree of polymerization of the polyvinyl alcohol resin, an appropriate value can be selected suitably depending on the intended use. The average degree of polymerization is preferably in the range from 1200 to 3600. The average degree of polymerization can be obtained based on JIS K 6726 (1994 version).

Any appropriate molding processing methods can be employed as a method for obtaining the polymer film that contains the polyvinyl alcohol resin. An example of the molding processing method includes a method described in Example 1 in JP 2000-315144 A.

The polymer film that contains the polyvinyl alcohol resin preferably contains at least one of a plasticizer and a surfactant. Examples of the plasticizer include polyalcohols such as ethylene glycol, glycerin, and the like. Examples of the surfactant include nonionic surfactants. The content of the plasticizer and the surfactant is preferably in the range from 1 part by weight to 10 parts by weight relative to 100 parts by weight of the polyvinyl alcohol resin. The plasticizer and the surfactant increase, for example, a stainability and a stretchability of the polarizer.

For example, a commercially available film can be directly used as the polymer film that contains the polyvinyl alcohol resin. Examples of the commercially available polymer film that contains the polyvinyl alcohol resin include "KURARAY VINYLON FILM" (product name) produced by Kuraray Co., Ltd., "TOHCELLO VINYLON FILM" (product name) produced by Tohcello Co., Ltd., "NICHIGO VINYLON FILM" (product name) produced by Nippon Synthetic Chemical Industry Co., Ltd., and the like.

<B-4. Optical Compensation Layer>

As described above, the optical compensation layer is a retardation film. The optical compensation layer contains at least one resin selected from the group consisting of norbornene resins, cellulose resins, polyvinyl acetal resins, polyimide resins, polyester resins, and polycarbonate resins.

The refractive index of the optical compensation layer shows the relation of nx>ny>nz (biaxiality) as described above. A method for producing the optical compensation layer (retardation film) that shows the relation of nx>ny>nz (biaxiality) is not particularly limited. The optical compensation layer (retardation film) that shows the relation of the biaxiality can be obtained, for example, by stretching a film by an appropriate method. The film contains at least one resin selected from the group consisting of norbornene resins, cellulose resins, polyvinyl acetal resins, polyimide resins, polyester resins, and polycarbonate resins. The stretching method can be appropriate methods such as a uniaxial stretching method, a biaxial stretching method, a tenter stretching method, a roll stretching method, and the like. More specifically, the stretching method can be selected suitably as described later depending on a chemical structure of the resin or the like. The Nz coefficient of the optical compensation layer is as described above. The level of the Nz coefficient can be controlled suitably, for example, by a draw ratio at the time of stretching.

<Norbornene Resin-Containing Retardation Film>

Hereinafter, the norbornene resin-containing retardation film is explained. The norbornene resin has a characteristic that an absolute value of a photoelastic coefficient (C [λ], the λ can be, for example, 590 nm) is small. The absolute value of the photoelastic coefficient (C [590]) of the norbornene resin at the wavelength of 590 nm is preferably in the range from $1 \times 10^{-12}$ m$^2$/N to $1 \times 10^{-11}$ m$^2$/N. In the present invention, "norbornene resin" is a (co)polymer that is obtained by using a norbornene monomer having a norbornene ring for a part or the whole of a starting material (monomer). The "(co)polymer" represents a homopolymer or a copolymer.

The norbornene resin uses a norbornene monomer having a norbornene ring (norbornane ring having a double bond) as a starting material. The norbornene resin may have or may not have a norbornane ring as a structural unit in a state of polymer or copolymer. Examples of the norbornene resin having a norbornane ring as a structural unit in a state of polymer or copolymer include tetracyclo[4.4.1$^{2,5}$.1$^{7,10}$.0]deca-3-en, 8-methyltetracyclo[4.4.1$^{2,5}$.1$^{7,10}$.0]deca-3-en, 8-methoxycarbonyltetracyclo[4.4.1$^{2,5}$.1$^{7,10}$.0]deca-3-en, and the like. The norbornene resin not having a norbornane ring as a structural unit in a state of polymer or copolymer is, for example, a polymer or copolymer obtained by using a monomer that is turned into a five-membered ring by cleavage. Examples of the monomer that is turned into a five-membered ring by cleavage include norbornene, dicyclopentadiene, 5-phenyl norbornene, a derivative thereof, and the like. When the norbornene resin is a copolymer, an alignment of its molecules is not particularly limited and may be a random copolymer, a block copolymer, or a graft copolymer.

Examples of the norbornene resin include (a) a resin obtained by hydrogenating a ring-opening polymer or a ring-opening copolymer of a norbornene monomer, (b) a resin obtained by conducting an addition polymerization or an addition copolymerization of a norbornene monomer, and the like. The resin obtained by hydrogenating a ring-opening copolymer of a norbornene monomer includes a resin that is obtained by hydrogenating a ring-opening copolymer of at least one kind of norbornene monomers and at least one of α-olefins, cycloalkenes, and unconjugated dienes. The resin obtained by conducting an addition copolymerization of a norbornene monomer includes a resin that is obtained by conducting an addition copolymerization of at least one kind of norbornene monomers with at least one of α-olefins, cycloalkenes, and unconjugated dienes.

The resin obtained by hydrogenating a ring-opening polymer or a ring-opening copolymer of a norbornene monomer can be obtained by conducting a metathesis reaction of a norbornene monomer to obtain a ring-opening polymer or a ring-opening copolymer, and then hydrogenating the thus obtained ring-opening polymer or ring-opening copolymer. Examples of such a producing method include the method described in the paragraphs [0059] to [0060] in JP11(1999)-116780 A, the method described in the paragraphs [0035] to [0037] in JP2001-350017 A, and the like. The resin obtained by conducting an addition polymerization or an addition copolymerization of a norbornene monomer can be produced by the method described in Example 1 in JP61(1986)-292601 A.

The weight-average molecular weight (Mw) of the norbornene resin is preferably in the range from 20000 to 500000 when the weight-average molecular weight is measured by a gel permeation chromatography method (polystyrene standard) using a tetrahydrofuran solvent. The glass-transition temperature (Tg) of the norbornene resin is preferably in the range from 120° C. to 170° C. By using the aforementioned resin, a retardation film that is further superior in heat resistance and stretchability can be obtained. The glass-transition temperature (Tg) is, for example, a value calculated by a differential scanning calorimetry (DSC) method based on JIS K 7121.

The norbornene resin-containing retardation film can be produced by stretching a sheet-like polymer film that is formed by a solvent casting method or a melt extrusion method by a vertical uniaxial stretching method, a horizontal uniaxial stretching method, a vertical and horizontal simultaneous biaxial stretching method, or a vertical and horizontal sequential biaxial stretching method. The stretching method is preferably a horizontal uniaxial stretching method in view of production efficiency. The temperature for stretching the polymer film (stretching temperature) is preferably in the range from 120° C. to 200° C. The ratio for stretching the polymer film (draw ratio) is preferably more than 1 and 4 or less. The stretching method may be a fixed end stretching method or a free end stretching method. When the fixed end stretching method is employed, a retardation film that shows the relation of nx>ny>nz can be produced.

As the norbornene resin-containing retardation film, for example, one obtained by applying a secondary processing such as at least one of a stretching treatment and a shrinkage treatment to a commercially available film can be used. Examples of the commercially available norbornene resin-containing retardation film include "ARTON" series ("ARTON F", "ARTON FX", and "ARTON D") (product names) produced by JSR Corporation, "ZEONOR" series ("ZEONOR ZF 14", "ZEONOR ZF 15", and "ZEONOR ZF" 16) (product names) produced by OPTES INC., and the like.

<Cellulose Resin-Containing Retardation Film>

Next, the cellulose resin-containing retardation film is explained. Any appropriate resins can be employed as the cellulose resin. The cellulose resin is preferably cellulose organic acid ester or cellulose mixed organic acid ester in which a part of or the whole of a hydroxyl group of cellulose is substituted by at least one of an acetyl group, a propionyl group, and a butyl group. Examples of the cellulose organic acid ester include cellulose acetate, cellulose propionate, cellulose butyrate, and the like. Examples of the cellulose mixed organic acid ester include cellulose acetate propionate, cellulose acetate butyrate, and the like. The cellulose resin can be obtained by the method described in the paragraphs [0040] to [0041] in JP2001-188128 A, for example.

The weight-average molecular weight (Mw) of the cellulose resin is preferably in the range from 20000 to 1000000 when the weight-average molecular weight is measured by a gel permeation chromatography method (polystyrene standard) using a tetrahydrofuran solvent. The glass-transition temperature (Tg) of the cellulose resin is preferably in the range from 110° C. to 185° C. The glass-transition temperature (Tg) can be calculated by a DSC method based on JIS K 7121. By using the aforementioned resin, a retardation film that is further superior in heat resistance and mechanical strength can be obtained.

The cellulose resin-containing retardation film (B2) can be obtained by an any appropriate molding processing method. Preferably, the retardation film (B2) is produced by forming into a sheet by a solvent casting method. For example, a commercially available cellulose resin-containing polymer film can be directly used as the retardation film (B2). Alternatively, as the retardation film (B2), one obtained by applying a secondary processing such as at least one of a stretching treatment and a shrinkage treatment to a commercially available film can be used. Examples of the commercially available film include "FUJITAC" series ("ZRF80S", "TD80UF", and "TDY-80UL") (product names) produced by Fuji Photo Film Co., Ltd., "KC8UX2M" (product name) produced by Konica Minolta Opto, Inc., and the like.

<Polyvinyl Acetal Resin-Containing Retardation Film>

Next, the polyvinyl acetal resin-containing retardation film is explained. The polyvinyl acetal resin is, for example, a resin that contains a polymer represented by the following general formula (3), although it is not particularly limited. The resin that contains a polymer represented by the following general formula (3) is described in the paragraph [0026] in JP3984277 B. The polymer is superior in transparency, heat resistance, and workability because of having a naphthyl group in a molecular structure.

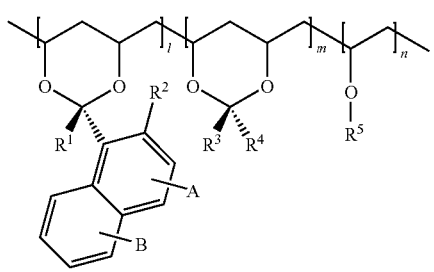

(3)

The polymer can be obtained by conducting a condensation reaction of a polyvinyl alcohol resin with at least one of at least two kinds of aldehyde compounds and ketone compounds. In the polymer shown in the general formula (3), an alignment order of each base unit of l, m, and n is not particularly limited, and may be any of an alternate alignment, a random alignment, and a block alignment. The polymer contains a polymer (so-clled high polymer) having a total degree of polymerization of the base units l, m, and n of 20 or more and having a higher weight-average molecular weight. The polymer further contains a low polymer (so-called oligomer) having a total degree of polymerization of the base units l, m, and n of 2 or more and less than 20 and having a weight-average molecular weight of several thousands.

In the general formula (3), $R^1$ and $R^3$ each represent a hydrogen atom, a halogen atom, a straight chain or branched chain alkyl group having 1 to 4 carbon atoms, or a substituted or unsubstituted phenyl group. The $R^1$ and $R^3$ may be identical to or different from each other.

In the general formula (3), $R^2$, A, and B each represent a hydrogen atom, a halogen atom, a straight chain or branched chain alkyl group having 1 to 4 carbon atoms, a straight chain or branched chain alkyl halide group having 1 to 4 carbon atoms, a straight chain or branched chain alkoxy group having 1 to 4 carbon atoms, an alkoxycarbonyl group, an acyloxy group, an amino group, an azido group, a nitro group, a cyano group, or a hydroxyl group. The $R^2$, A, and B may be identical to or different from one another. However, the $R^2$ is not a hydrogen atom.

In the general formula (3), $R^4$ represents a hydrogen atom, a straight chain or branched chain alkyl group having 1 to 4 carbon atoms, a substituted or unsubstituted cycloalkyl group having 5 to 10 carbon atoms, a substituted or unsubstituted phenyl group, a substituted or unsubstituted naphthyl group, or a substituted or unsubstituted hetero ring group.

In the general formula (3), $R^5$ represents a hydrogen atom, a straight chain or branched chain alkyl group having 1 to 4 carbon atoms, a benzyl group, a silyl group, a phosphate group, an acyl group, a benzoyl group, or a sulfonyl group.

The polyvinyl acetal resin-containing retardation film is produced by stretching a polymer film that is obtained by forming the polyvinyl acetal resin into a sheet by appropriately selecting stretching conditions (e.g., a stretching temperature, a stretching ratio, a stretching direction, or the like), stretching methods, and the like. Examples of the method for forming the polyvinyl acetal resin into a sheet include a compression molding method, a transfer molding method, an injection molding method, an extrusion molding method, a blow molding method, a powder molding method, an FRP molding method, a solvent casting method, and the like.

<Polyimide Resin-Containing Retardation Film>

Next, the polyimide resin-containing retardation film is explained. When the polyimide resin is formed into a sheet by a solvent casting method, in a step of evaporating a solvent, molecules are more likely to be aligned voluntarily. Therefore, according to this molding method, a retardation film having a refractive index ellipsoidal body showing the relation of nx=ny>nz (negative uniaxiality) can be produced very thin. Further, by stretching the retardation film, a retardation film showing the relation of nx>ny>nz (biaxiality) can be produced very thin. The thickness of the polyimide resin-containing retardation film (B1) is preferably in the range from 0.5 µm to 10 µm and more preferably in the range from 1 µm to 5 µm. The birefringence ($\Delta n_{xz}$ [590]) of the retardation film (B1) in the thickness direction is preferably in the range from 0.01 to 0.12 and more preferably in the range from 0.02 to 0.08. Such a polyimide resin can be obtained, for example, by a method described in U.S. Pat. No. 5,344,916.

Preferably, the polyimide resin includes at least one of a hexafluoroisopropylidene group and a trifluoromethyl group. More preferably, the polyimide resin includes at least a repeating unit represented by the following general formula (4) or a repeating unit represented by the following general formula (5). Since polyimide resins including these repeating units are superior in solubility in a general-purpose solvent, a film can be formed by a solvent casting method. Further, also on a base inferior in a solvent resistance such as a TAC film or the like, without excessively eroding the surface thereof, a thin layer of the polyimide resin can be formed.

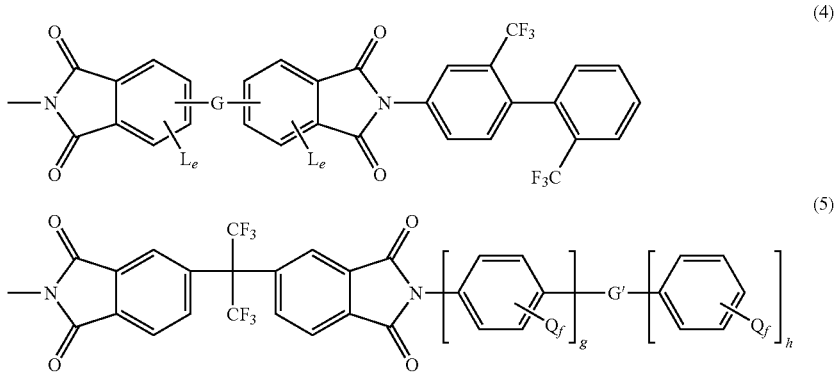

(4)

(5)

In the general formulae (4) and (5), G and G' each represent a group selecting from the group consisting of covalent bonds, $CH_2$ groups, $C(CH_3)_2$ groups, $C(CF_3)_2$ groups, $C(CX_3)_2$ groups (here, X is halogen), CO groups, O atoms, S atoms, $SO_2$ groups, $Si(CH_2CH_3)_2$ groups, and $N(CH_3)$ groups. G and G' may be identical to or different from each other.

In the general formula (4), L represents a substituent group and e represents the number of substituents. L represents, for example, halogen, an alkyl group having 1 to 3 carbon atoms, an alkyl halide group having 1 to 3 carbon atoms, a phenyl group, or a substituted phenyl group. When L is more than one, each L may be identical to or different from each other. The e is an integer from 0 to 3.

In the general formula (5), Q represents a substituent group and f represents the number of substituents. Q represents an atom or a group selected from the group consisting of hydrogen, halogen, an alkyl group, a substituted alkyl group, a nitro group, a cyano group, a thioalkyl group, an alkoxy group, an aryl group, a substituted aryl group, an alkyl ester group, and a substituted alkyl ester group. When Q is more than one, each Q may be identical to or different from each other. The f is an integer from 0 to 4, and g and h each are an integer from 1 to 3.

The polyimide resin can be obtained, for example, by causing a tetracarboxylic dianhydride to be reacted with diamine. The repeating unit represented by the general formula (4) can be obtained by causing a tetracarboxylic dianhydride having at least two aromatic rings to be reacted with diamine. In this state, 2,2'-bis(trifluoromethyl)-4,4'-diaminobiphenyl is used as the diamine. The repeating unit represented by the general formula (5) can be obtained by causing a tetracarboxylic dianhydride to be reacted with diamine having at least two aromatic rings. In this state, a 2,2'-bis(3,4-dicarboxyphenyl) hexafluoropropane dianhydride is used as the tetracarboxylic dianhydride. The reaction may be a chemical imidization having two reaction steps or a thermal imidization having one reaction step.

Any appropriate dianhydride can be selected as the tetracarboxylic dianhydride. Examples of the tetracarboxylic dianhydride include a 2,2'-bis(3,4-dicarboxyphenyl) hexafluoropropane dianhydride, a 3,3',4,4'-benzophenone tetracarboxylic dianhydride, a 2,3,3',4-benzophenone tetracarboxylic dianhydride, a 2,2',3,3'-benzophenone tetracarboxylic dianhydride, a 2,2'-dibromo-4,4',5,5'-biphenyl tetracarboxylic dianhydride, a 2,2'-bis(trifluoromethyl)-4,4',5,5'-biphenyl tetracarboxylic dianhydride, a 3,3',4,4'-biphenyl tetracarboxylic dianhydride, a 4,4'-bis(3,4-dicarboxyphenyl) ether dianhydride, a 4,4'-oxydiphthalic dianhydride, a 4,4'-bis(3,4-dicarboxyphenyl)sulfone dianhydride, a bis(2,3-dicarboxyphenyl)methane dianhydride, a bis(3,4-dicarboxyphenyl)diethylsilane dianhydride, and the like.

Any appropriate diamine can be selected as the diamine. Examples of the diamine include 2,2'-bis(trifluoromethyl)-4,4'-diaminobiphenyl, 4,4'-diaminobiphenyl, 4,4'-diaminophenylmethane, 4,4'-(9-fluorenylidene)-dianiline, 3,3'-dichloro-4,4'-diaminophenylmethane, 2,2'-dichloro-4,4'-diaminobiphenyl, 4,4'-diaminophenyl ether, 3,4'-diaminodiphenyl ether, 4,4'-diaminodiphenyl sulfon, 4,4'-diaminodiphenyl thioether, and the like.

The weight-average molecular weight (Mw) of the polyimide resin is preferably in the range from 20000 to 180000 when a dimethylformamide solution (1 L of dimethylformamide solution obtained by adding 10 mM of lithium bromide and 10 mM of phosphoric acid and then messing up) is used as a developing solvent. The degree of imidization of the polyimide resin is preferably 95% or more. The degree of imidization of the polyimide resin can be obtained from an integral intensity ratio of a proton peak derived from a polyamic acid that is a precursor of polyimide and a proton peak derived from polyimide.

The polyimide resin-containing retardation film (B1) can be obtained by an any appropriate molding processing method. Preferably, the retardation film (B1) is produced by forming into a sheet by a solvent casting method and then stretching.

Further, also with respect to the polyester resin-containing retardation film and the polycarbonate resin-containing retardation film, the chemical structure of the resin and the method for producing the retardation film are not particularly limited.

The optical compensation layer may further contain any appropriate additive. Examples of the additive include plasticizers, thermostabilizers, light stabilizers, lubricants, antioxidants, ultraviolet absorbers, flame retardants, coloring agents, antistatic agents, compatibilizing agents, cross-linking agents, thickeners, and the like. The content of the additive is preferably more than 0 parts by weight and 10 parts by weight or less relative to 100 parts by weight of the base resin.

Re [590] of the optical compensation layer is not particularly limited, however is, for example, 10 nm or more and preferably in the range from 50 nm to 200 nm. When the refractive index of the optical compensation layer shows the relation of nx>ny=nz, Re [590] is, for example, in the range from 90 nm to 190 nm and preferably in the range from 110 nm to 170 nm. When the refractive index of the optical compensation layer shows the relation of nx>ny>nz (negative biaxiality), Re [590] is, for example, in the range from 70 nm to 170 nm and preferably in the range from 90 nm to 150 nm.

When the refractive index of the optical compensation layer shows the relation of nx>ny>nz, Rth [590] is larger than Re [590]. In this case, the difference between the Rth [590] and Re [590] (Rth [590]−Re [590]) is not particularly limited, however is, for example, in the range from 10 nm to 100 nm and preferably in the range from 20 nm to 80 nm.

The transmittance (T [590]) of the optical compensation layer at the wavelength of 590 nm is preferably 90% or more.

The optical compensation layer may be a single layer or a laminate made of plural layers. The thickness of the optical compensation layer is, for example, in the range from 0.5 μm to 200 μm, although it is not particularly limited.

<B-5. Laminate of Polarizer and Optical Compensation Layer>

Preferably, the polarizer and the optical compensation layer are laminated via an adhesive layer. By taking FIG. 1 as an example, the polarizer 12 and the compensation layer 13 are laminated via an adhesive layer.

Preferably, the surface of the optical compensation layer that adheres to the polarizer is applied with an easy-adhesion treatment. The easy-adhesion treatment is preferably a treatment of coating with resin materials. Preferable examples of the resin material include silicon resins, urethane resins, and acrylic resins. By applying the easy-adhesion treatment, an easy-adhesion layer is formed on the surface of the optical compensation layer that adheres to the polarizer. The thickness of the easy-adhesion layer is not particularly limited, however is preferably in the range from 5 nm to 100 nm and more preferably in the range from 10 nm to 80 nm.

The adhesive layer may be provided on the polarizer side, on the optical compensation layer side, or on both of the polarizer side and the optical compensation layer side.

The adhesive layer may be a pressure-sensitive adhesive agent layer formed from a pressure-sensitive adhesive agent. In this case, any appropriate pressure-sensitive adhesive agents can be employed as the pressure-sensitive adhesive agent. Examples of the pressure-sensitive adhesive agent include a solvent pressure-sensitive adhesive agent, a non-aqueous emulsion pressure-sensitive adhesive agent, an aqueous pressure-sensitive adhesive agent, a hot-melt pressure-sensitive adhesive agent, and the like. Among them, a solvent pressure-sensitive adhesive agent containing an acrylic polymer as a base polymer is preferably used. This is because such a pressure-sensitive adhesive agent shows reasonable pressure-sensitive adhesion properties (e.g., wettability, aggregability, and adhesiveness) to the polarizer and the optical compensation layer and is superior in optical transparency, weather resistance, and heat resistance.

The thickness of the pressure-sensitive adhesive agent layer can be set suitably depending on the intended use, adhesive force, and the like. For example, the thickness of the pressure-sensitive adhesive agent layer is preferably in the range from 1 μm to 100 μm, more preferably in the range from 3 μm to 50 μm, further preferably in the range from 5 μm to 30 μm, and particularly preferably in the range from 10 μm to 25 μm.

The adhesive layer may be an adhesive agent layer. The adhesive agent layer can be formed by coating the surface of at least one of the optical compensation layer and the polarizer with a coating solution that contains an adhesive agent at a predetermined ratio, and then drying. Any appropriate methods can be employed for the method for preparing the coating solution. As the coating solution, for example, a commercially available solution or a dispersion liquid may be used directly or a commercially available solution or a dispersion liquid to which a solvent is further added may be used. In addition, a solid content may be dissolved or dispersed in each solvent.

As the adhesive agent, adhesive agents having any appropriate properties, forms, and adhesive mechanisms can be used depending on the intended use. Examples of the adhesive agent include a water-soluble adhesive agent, an emulsion adhesive agent, a latex adhesive agent, a mastic adhesive agent, a double-layered adhesive agent, a paste adhesive agent, a foam adhesive agent, a supported film adhesive agent, a thermoplastic adhesive agent, a thermofusion adhesive agent, a thermosolidification adhesive agent, a hot-melt adhesive agent, a thermoactive adhesive agent, a heat-seal adhesive agent, a thermosetting adhesive agent, a contact adhesive agent, a pressure-sensitive adhesive agent, a polymeric adhesive agent, a solvent adhesive agent, a solvent active adhesive agent, and the like. Among them, a water-soluble adhesive agent that is superior in transparency, adhesiveness, workability, quality of a product, and economic efficiency is preferably used.

The water-soluble adhesive agent may contain at least one of a water-soluble natural polymer and a water-soluble synthetic polymer. Examples of the natural polymer include proteins, starches, and the like. Examples of the synthetic polymer include resol resins, urea resins, melamine resins, polyethylene oxides, polyacrylamides, polyvinylpyrrolidones, acrylic esters, methacrylate esters, polyvinyl alcohol resins, and the like. Among them, a water-soluble adhesive agent that contains a polyvinyl alcohol resin is preferably used and a water-soluble adhesive agent that contains a modified polyvinyl alcohol resin having an acetoacetyl group (acetoacetyl group-containing polyvinyl alcohol resin) is further preferably used. In other words, as described above, in the polarizing plate of the present invention, the adhesive layer preferably contains a water-soluble adhesive agent that contains a polyvinyl alcohol resin. This is because such an adhesive agent is excellent in adhesiveness with the polarizer and is superior in adhesiveness with the optical compensation layer. Examples of the acetoacetyl group-containing polyvinyl alcohol resin include "GOHSENOL Z" series (product name), "GOHSENOL NH" series (product name), and "GOHSEFIMER Z" series (product name), produced by Nippon Synthetic Chemical Industry Co., Ltd., and the like.

Examples of the polyvinyl alcohol resin include a saponifiable matter of polyvinyl acetate; a derivative of the saponifiable matter; a saponifiable matter of a copolymer of vinyl acetate and a copolymerizable monomer; modified polyvinyl alcohols obtained, for example, by acetalizing, urethanizing, etherifying, grafting, esterifying polyvinyl alcohols; and the like. Examples of the monomer include unsaturated carboxylic acids such as a maleic acid, a maleic acid anhydride, a fumaric acid, a crotonic acid, an itaconic acid, an acrylic acid, a methacrylic acid, and the like; esters thereof; α-olefins such as ethylene, propylene, and the like; aryl sulfonic acid; methallyl sulfonic acid;

sodium aryl sulfonate; sodium methallyl sulfonate; sodium sulfonate; sodium sulfonate monoalkylmalate; sodium disulfonate alkylmalate; N-methylol acrylamide; acrylamide alkyl sulfonate alkali salt; N-vinylpyrrolidone; a derivative of N-vinylpyrrolidone; and the like. One of these resins may be used alone or two or more of them may be used in combination.

The average degree of polymerization of the polyvinyl alcohol resin is preferably in the range from 100 to 5000 and more preferably in the range from 1000 to 4000 in view of adhesiveness. The average degree of saponification of the polyvinyl alcohol resin is preferably in the range from 85 mol % to 100 mol % and more preferably in the range from 90 mol % to 100 mol % in view of adhesiveness.

The acetoacetyl group-containing polyvinyl alcohol resin can be obtained by reacting a polyvinyl alcohol resin with diketene by any method. Examples of the aforementioned method are as follows: a method in which diketene is added to a dispersion element that is obtained by dispersing a polyvinyl alcohol resin in a solvent such as an acetic acid or the like; a method in which diketene is added to a solution that is obtained by dissolving a polyvinyl alcohol resin in a solvent such as dimethylformamide, dioxane, or the like; and a method in which gaseous diketene or liquid diketene is brought into contact with a polyvinyl alcohol resin directly.

The modification degree of the acetoacetyl group of the acetoacetyl group-containing polyvinyl alcohol resin is, for example, 0.1 mol % or more. By setting the modification degree of the acetoacetyl group in the aforementioned range, a polarizing plate further superior in water resistance can be obtained. The modification degree of the acetoacetyl group is preferably in the range from 0.1 mol % to 40 mol %, more preferably in the range from 1 mol % to 20 mol %, and further preferably in the range from 2 mol % to 7 mol %. The modification degree of the acetoacetyl group is, for example, a value measured by a nuclear magnetic resonance (NMR) method.

The water-soluble adhesive agent that contains a polyvinyl alcohol resin may further contain a cross-linking agent. This is because such an adhesive agent can further improve water resistance. Any appropriate cross-linking agents can be employed as the cross-linking agent. The cross-linking agent is preferably a compound having at least two functional groups that are responsive to the polyvinyl alcohol resin. Examples of the cross-linking agent include alkylene diamines having two alkylene groups and two amino groups (e.g. ethylenediamine, triethylenediamine, hexamethylenediamine, and the like), isocyanates (e.g., tolylene diisocyanate, tolylene diisocyanate hydride, trimethylolpropane tolylene diisocyanate adduct, triphenylmethane triisocyanate, methylenebis(4-phenyl)methane triisocyanate, isophorone diisocyanate, a ketoxime block or a phenol block thereof, and the like), epoxys (e.g., ethylene glycol diglycidyl ether, polyethylene glycol diglycidyl ether, glycerin diglycidyl ether, glycerin triglycidyl ether, 1,6-hexanediol diglycidyl ether, trimethylolpropane triglycidyl ether, diglycidyl aniline, diglycidyl amine, and the like), dialdehydes (e.g., monoaldehydes such as formaldehyde, acetaldehyde, propionaldehyde, butylaldehyde, and the like; glyoxal, malondialdehyde, succindialdehyde, glutardialdehyde, malleindialdehyde, phthaldialdehyde, and the like); amino-formaldehyde resins (e.g., methylolurea, methylolmelamine, alkylated methylolurea, alkylated methylolated melamine, acetoguanamine, a condensation product of benzoguanamine and formaldehyde, and the like), salts of monovalent, divalent, or trivalent metals (e.g., sodium, potassium, magnesium, calcium, aluminum, iron, nickel, and the like) and oxidation products of these metals. Among them, amino-formaldehyde resins and/or dialdehydes are preferable. As the amino-formaldehyde resin, a compound having a methylol group is preferable. As the dialdehyde, glyoxal is preferable. Above all, the compound having a methylol group is preferable and methylol melamine is particularly preferable. Examples of the aldehyde compound include "GLYOXAL" (product name) produced by Nippon Synthetic Chemical Industry Co., Ltd., "SEQUAREZ 755" (product name) produced by OMNOVA Solutions Inc.; and the like. Examples of the amine compound include "META-XYLENEDIAMINE" (product name) produced by Mitsubishi Gas Chemical Co., Inc.; and the like.

Examples of the methylol compound include "WATERSOL" series (product name) produced by Dainippon Ink and Chemicals, Inc.; and the like.

The amount of the cross-linking agent to be added is preferably in the range from 1 part by weight to 60 parts by weight relative to 100 parts by weight of the polyvinyl alcohol resin (preferably, the acetoacetyl group-containing polyvinyl alcohol resin). By setting the amount of the cross-linking agent to be added in the aforementioned range, an adhesive layer superior in transparency, adhesiveness, and water resistance can be formed. The upper limit of the amount of the cross-linking agent to be added is preferably 50 parts by weight, more preferably 30 parts by weight, further preferably 15 parts by weight, particularly preferably 10 parts by weight, and most preferably 7 parts by weight. The lower limit of the amount of the cross-linking agent to be added is preferably 5 parts by weight, more preferably 10 parts by weight, and further preferably 20 parts by weight. It is to be noted that when the metal compound colloid that will be described later is also used, stability in a case where the amount of the cross-linking agent to be added is large can be further increased.

Any appropriate methods can be employed as the method for preparing the adhesive agent. Examples of the method for preparing the metal compound colloid-containing adhesive agent are as follows: a method in which the metal compound colloid is added to a solution prepared by preliminarily mixing the polyvinyl alcohol resin and the cross-linking agent to have an appropriate concentration, and a method in which the polyvinyl alcohol resin and the metal compound colloid are mixed and then the cross-linking agent is added thereto in consideration of time for using.

The resin concentration of the adhesive agent is preferably in the range from 0.1% by mass to 15% by mass and more preferably in the range from 0.5% by mass to 10% by mass in view of coating properties, left stability, and the like.

The pH of the adhesive agent is preferably in the range from 2 to 6, more preferably in the range from 2.5 to 5, further preferably in the range from 3 to 5, and particularly preferably in the range from 3.5 to 4.5. Generally, the surface charge of the metal compound colloid can be controlled by adjusting the pH of the adhesive agent. The surface charge is preferably a positive charge. When the surface charge is a positive charge, an occurrence of knick can be prevented more suitably.

The total solid content concentration of the adhesive agent differs depending on solubility, coating viscosity, and wettability of the adhesive agent; a desired thickness of the adhesive agent layer; and the like. The total solid content concentration is preferably in the range from 2 parts by weight to 100 parts by weight relative to 100 parts by weight of a solvent. By setting the total solid content concentration in the aforementioned range, an adhesive agent layer having higher surface uniformity can be obtained. The total solid content concentration is more preferably in the range from 10 parts by weight to 50 parts by weight and further preferably in the range from 20 parts by weight to 40 parts by weight.

The viscosity of the adhesive agent is not particularly limited, however it is preferably in the range from 1 mPa·s to 50 mPa·s when the viscosity is measured at the shear velocity of 1000 (1/s) at 23° C. By setting the viscosity of the adhesive agent in the aforementioned range, an adhesive layer having higher surface uniformity can be obtained. The viscosity of the adhesive agent is more preferably in the range from 2 mPa·s to 30 mPa·s and further preferably in the range from 4 mPa·s to 20 mPa·s.

The glass-transition temperature (Tg) of the adhesive agent is not particularly limited, however is preferably in the range from 20° C. to 120° C., more preferably in the range from 40° C. to 100° C., and further preferably in the range from 50° C. to 90° C. The glass-transition temperature can be measured by a differential scanning calorimetry (DSC) based on JIS K 7121 (1987 version).

The adhesive agent may further contain coupling agents such as a silane coupling agent, a titanium coupling agent, and the like; various tackifiers; ultraviolet absorbers; antioxidants; stabilizers such as a heat-resistant stabilizer, a hydrolysis resistance stabilizer, and the like; and the like.

Any appropriate methods can be employed as the coating method of the adhesive agent. Examples of the coating method include a spin coating method, a roll coating method, a flow coating method, a dip coating method, a bar coating method, and the like.

The thickness of the adhesive agent layer is preferably in the range from 0.01 µm to 0.15 µm, although it is not particularly limited. By setting the thickness of the adhesive agent layer in the aforementioned range, a polarizing plate can be obtained that is superior in durability and does not cause pealing or floating of a polarizer even in hot and humid conditions. The thickness of the adhesive agent layer is more preferably in the range from 0.02 µm to 0.12 µm and further preferably in the range from 0.03 µm to 0.09 µm.

<C. Liquid Crystal Panel>
<C-1. Whole Structure of Liquid Crystal Panel of Present Invention>

Figure 2:
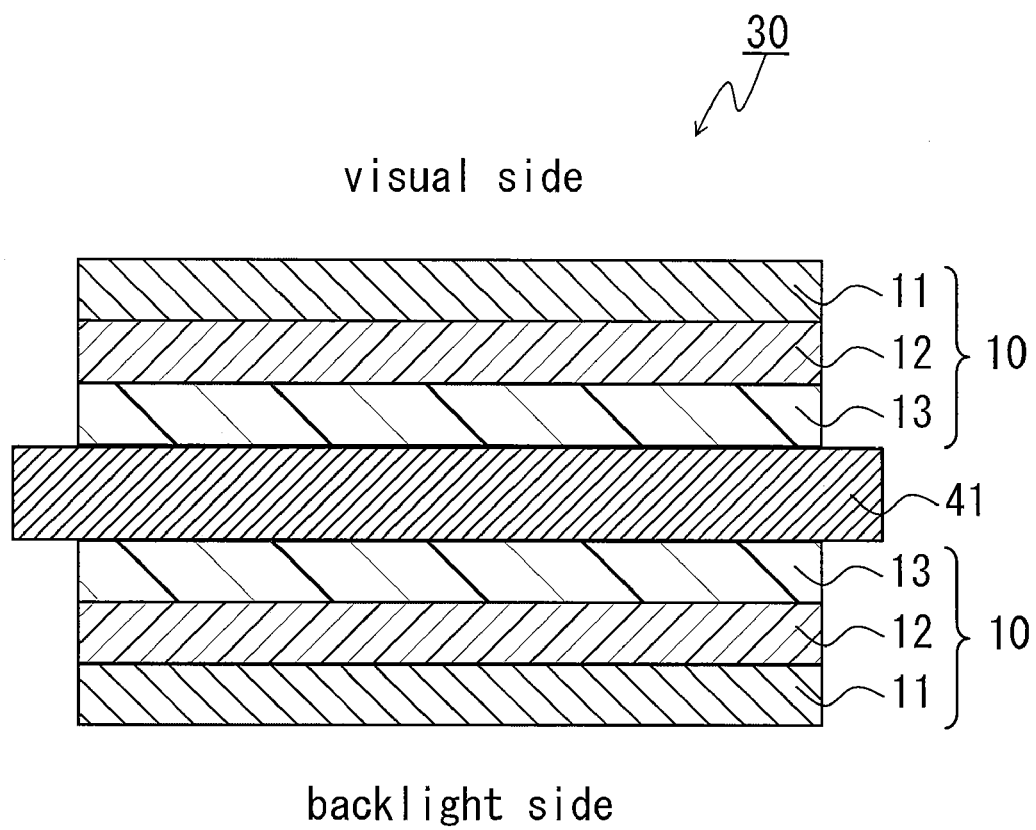
FIG. 2 is a schematic cross sectional view showing an example of the structure of the liquid crystal panel of the present invention.

As described above, the liquid crystal panel of the present invention is a liquid crystal panel, wherein a polarizing plate is arranged on at least one side of the liquid crystal cell, and the polarizing plate is the polarizing plate of the present invention. A schematic cross sectional view of FIG. 2 shows an example of the structure of the liquid crystal panel of the present invention. In FIG. 2, identical parts to those shown in FIG. 1 are indicated with identical numerals and symbols. As shown in FIG. 2, in a first liquid crystal panel 30, polarizing plates 10 of the present invention are arranged on both of the visible side of a liquid crystal cell 41 (upper side in FIG. 2) and the backlight side of the liquid crystal cell 41 (lower side in FIG. 2). In the polarizing plate 10, an optical compensation layer 13 is arranged on the liquid crystal cell 41 side. It is to be noted that the backlight is not shown in FIG. 2. Further, in the liquid crystal panel of this example, the polarizing plates of the present invention are arranged on both of the visible side of the liquid crystal cell and the backlight side. However, the present invention is not limited thereto.

Figure 3:
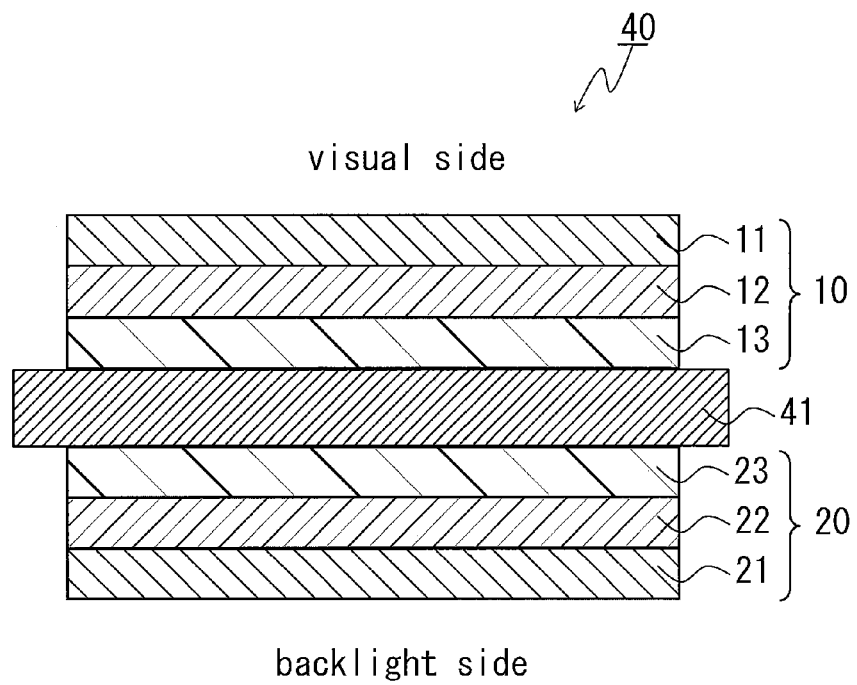
FIG. 3 is a schematic cross sectional view showing another example of the structure of the liquid crystal panel of the present invention.

A schematic cross sectional view of FIG. 3 shows another example of the structure of the liquid crystal panel of the present invention. In FIG. 3, identical parts to those shown in FIG. 1 are indicated with identical numerals and symbols. As shown in FIG. 3, a liquid crystal panel 40 includes the polarizing plate 10 of the present invention, an other polarizing plate 20, and a liquid crystal cell 41 as main components. The other polarizing plate 20 is constructed by laminating a transparent protective film 21, a polarizer 22, and an optical compensation layer 23 in this order. In the liquid crystal panel 40, the polarizing plate 10 of the present invention is arranged on the backlight side of the liquid crystal cell 41 and the other polarizing plate 20 is arranged on the visible side of the liquid crystal cell 41. In polarizing plates 10 and 20, optical compensation layers 13 and 23 are respectively arranged on the liquid crystal cell 41 side. In other words, this liquid crystal panel 40 has a structure similar to that of the liquid crystal panel shown in FIG. 2 except that the polarizing plate on the visible side is replaced by the other polarizing plate 20. The transparent protective film 21, the polarizer 22, and the optical compensation layer 23 are optional and are not particularly limited. The other polarizing plate 20 is not particularly limited and may be a polarizing plate commonly used in a liquid crystal panel, for example.

The liquid crystal panel of the present invention is applicable as long as the polarizing plate of the present invention is arranged on at least one of the visible side of the liquid crystal cell and the back side of the visible side of the liquid crystal cell. However, for example, as the liquid crystal panels shown in FIGS. 2 and 3, it is preferable that the polarizing plate of the present invention is arranged on at least the back side of the visible side of the liquid crystal cell. In the liquid crystal panel of the present invention, when the polarizing plate of the present invention is arranged on the back side of the visible side of the liquid crystal cell, the advantages of the present invention such as suppression of light leak and prevention of brightness irregularity can be further enhanced, and also superior viewing angle properties can be obtained. Further in this case, when the liquid crystal display includes a backlight, the aforementioned suppression of light leak, prevention of brightness irregularity, and viewing angle properties are further enhanced. Details of the liquid crystal display will be described later.

<C-2. Liquid Crystal Cell>

Examples of the liquid crystal cell include an active matrix liquid crystal cell using a thin-film transistor, and the like. Examples of the liquid crystal cell include a simple matrix liquid crystal cell employed for a super-twisted nematic liquid crystal display, and the like.

Figure 4:
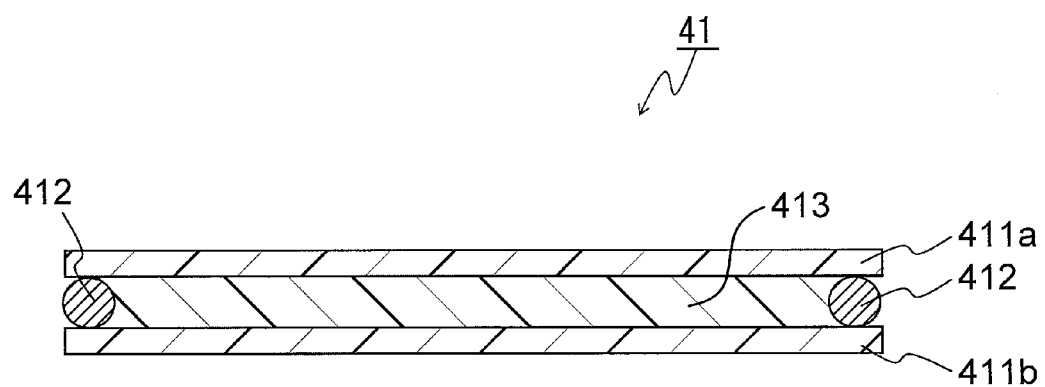
FIG. 4 is a schematic cross sectional view showing an example of the structure of the liquid crystal cell of the present invention.

Generally, the liquid crystal cell has a structure in which a liquid crystal layer is interposed between a pair of substrates. FIG. 4 shows an example of the structure of the liquid crystal cell. As shown in FIG. 4, in a liquid crystal cell 41 of this example, a space is formed by arranging spacers 412 between a pair of substrates 411. In the space, a liquid crystal layer 413 is interposed between the pair of substrates 411. On one of the substrates (active matrix substrate), for example, a switching element (e.g. TFT), a scanning line, and a signaling line may be provided, although they are not shown in FIG. 4. The switching element controls electrooptic properties of liquid crystal molecules, the scanning line sends a gate signal to the switching element, and the signaling line sends a source signal to the switching element. On the other one of the substrates, for example, a color filter may be provided.

The color filter may be provided on the active matrix substrate. Alternatively, for example, when a three color light source (may further contain multicolor light source) of RGB is used as a lighting means of a liquid crystal display as in the case of a field sequential method, the color filter may be omitted. A cell gap between the pair of substrates may be controlled, for example, by spacers. The cell gap is, for example, in the range from 1.0 µm to 7.0 µm. On the side of each substrate that is to be in contact with the liquid crystal layer, for example, an alignment film made from polyimide is provided. Alternatively, for example, when an initial alignment of liquid crystal molecules is controlled using a fringe electric field formed with a patterned transparent substrate, the alignment film may be omitted.

The refractive index of the liquid crystal cell preferably shows the relation of $nz>nx=ny$. According to the classification of drive modes, examples of the drive mode of the liquid crystal cell whose refractive index shows the relation of $nz>nx=ny$ include a vertical alignment (VA) mode, a twisted nematic (TN) mode, a vertical alignment electrically controlled birefringence (ECB) mode, an optical compensation birefringent (OCB) mode, and the like. In the present invention, the drive mode of the liquid crystal cell is particularly preferably the VA mode.

Rth [590] of the liquid crystal cell in the absence of an electric field is preferably in the range from −500 nm to −200 nm and more preferably in the range from −400 nm to −200 nm. The Rth [590] is set suitably by adjusting the birefringence of liquid crystal molecules and the cell gap, for example.

In the VA mode liquid crystal cell, in the absence of an electric field, liquid crystal molecules are aligned in a homeotropic alignment. In the VA mode liquid crystal cell, the liquid crystal molecules are caused to respond in an electric field in a normal direction relative to a substrate by using a voltage control birefringence effect. Specifically, the responses of the liquid crystal molecules are described, for example, in JP62 (1987)-210423 A and JP4(1992)-153621 A. That is, in a case of a normally black method, in the absence of an electric field, liquid crystal molecules are aligned in a normal direction relative to a substrate. Therefore, when an upper polarizing plate and a lower polarizing plate are orthogonally aligned, a black display can be obtained. On the other hand, in the presence of an electric field, liquid crystal molecules are inclined in about 45° relative to an absorption axis of a polarizing plate. Thereby, the transmittance is increased and a white display can be obtained.

The VA mode liquid crystal cell may be a multi-domain liquid crystal cell obtained by using a liquid crystal cell in which slits are formed at an electrode or using a liquid crystal cell in which protrusions are formed on the surface. Such a liquid crystal cell is described, for example, in JP11(1999)-258605 A. Examples of such a liquid crystal cell include "ASV (advanced super view) mode" (product name), "CPA (continuous pinwheel alignment) mode" (product name) produced by Sharp Corporation; "MVA (multi-domain vertical alignment) mode" (product name) produced by Fujitsu Ltd.; "PVA (patterned vertical alignment) mode" (product name), "EVA (enhanced vertical alignment) mode" (product name) produced by Samsung Electronics; "SURVIVAL" ("super ranged viewing vertical alignment") mode (product name) produced by Sanyo Electric Co., Ltd.; and the like.

As the liquid crystal cell, for example, a liquid crystal cell mounted to a commercially available liquid crystal display may be used directly. Examples of the commercially available liquid crystal display having the VA mode liquid crystal cell include "AQUOS" series (product name) of liquid crystal display TVs produced by Sharp Corporation, "BRAVIA" series (product name) of liquid crystal display TVs produced by Sony Corp., "LN32R51B" (product name) of 32V wide liquid crystal display TVs produced by Samsung Electronics, "FORIS SC26XD1" (product name) of liquid crystal display TVs produced by Eizo Nanao Corp., "T460HW01" (product name) of liquid crystal display TVs produced by AU Optronics Corp., and the like.

<D. Liquid Crystal Display>

Figure 5:
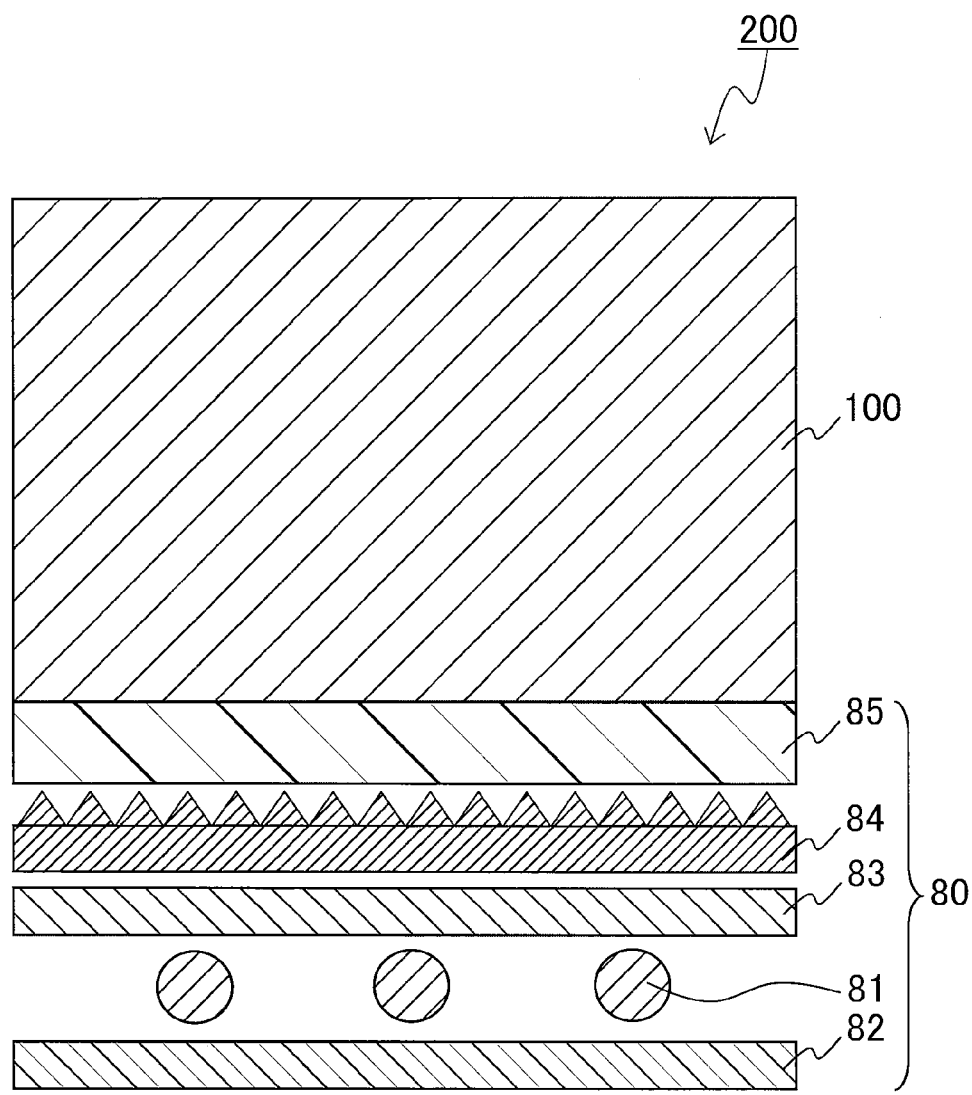
FIG. 5 is a schematic cross sectional view showing an example of the structure of the liquid crystal display of the present invention.

As described above, the liquid crystal display of the present invention includes the polarizing plate of the present invention or the liquid crystal panel of the present invention. A schematic cross sectional view of FIG. 5 shows an example of the structure of the liquid crystal display of the present invention. In FIG. 5, in order to make it clearly understandable, for example, the sizes and ratios of respective components differ from actual ones. As shown in FIG. 5, a liquid crystal display 200 is provided with at least a liquid crystal panel 100 and a direct type backlight unit 80 that is arranged on the one side of the liquid crystal panel 100. The direct type backlight unit 80 is provided with at least a light source 81, a reflection film 82, a diffusion plate 83, a prism sheet 84, and a brightness enhancement film 85. It is to be noted that the liquid crystal display 200 of this example shows a case in which a direct type backlight unit is used as the backlight unit. However, the present invention is not limited thereto, and the backlight unit may be a side light type backlight unit. The side light type backlight unit is provided with at least a light guide plate and a light reflector in addition to the components of the aforementioned direct type backlight unit. Some of the components shown in FIG. 5 may be omitted or replaced by other optical members depending on the intended use such as a lighting method of a liquid crystal display, a drive mode of a liquid crystal cell, or the like as long as the advantages of the present invention can be obtained.

Figure 6:
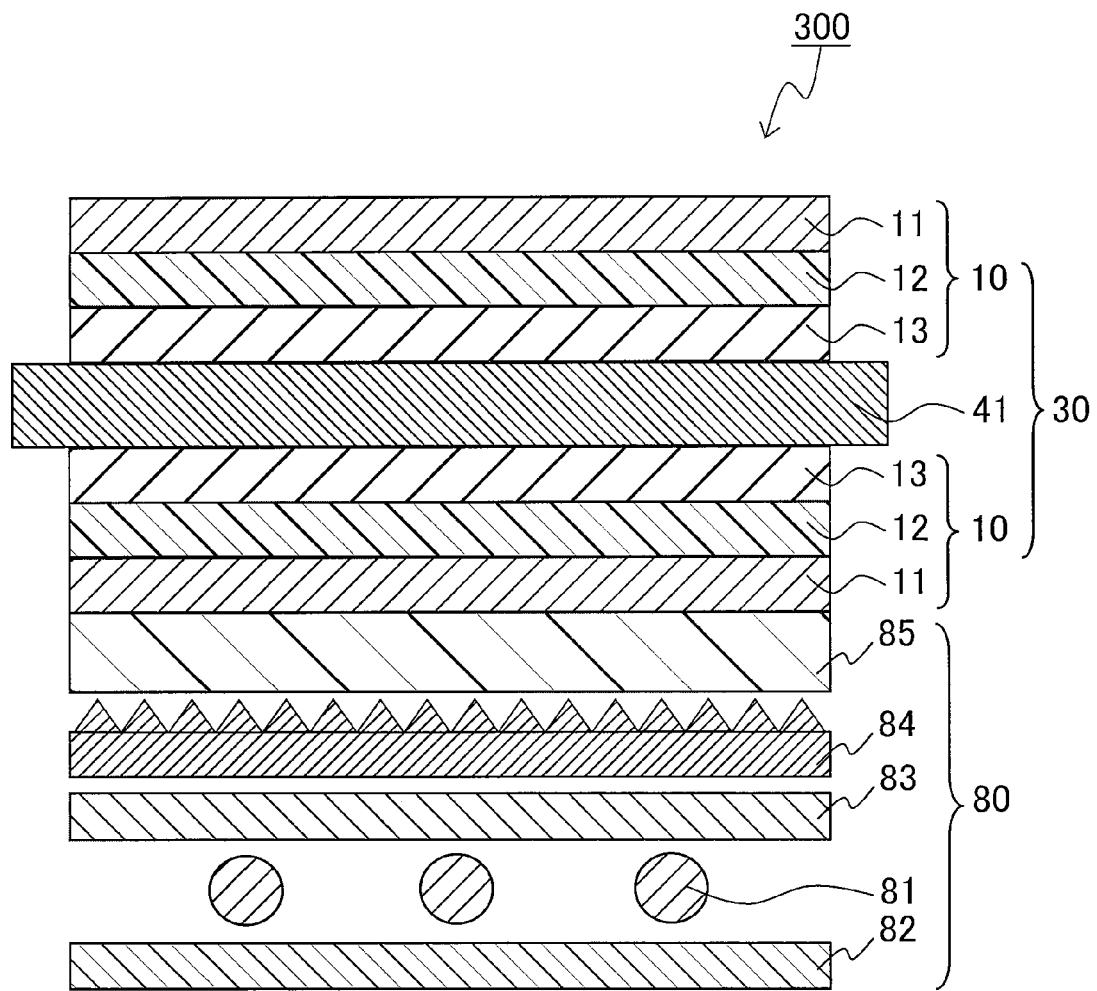
FIG. 6 is a schematic cross sectional view showing another example of the structure of the liquid crystal display of the present invention.

The liquid crystal display of the present invention may be a transmission type in which a screen is seen by irradiating the backlight side of the liquid crystal panel with light, a reflection type in which a screen is seen by irradiating the visible side of the liquid crystal panel with light, or a semi-transmission type that has both properties of the transmission type and the reflection type. However, the liquid crystal display of the present invention is preferably the transmission type in which a screen is seen by irradiating the backlight side of the liquid crystal panel with light because such a liquid crystal display is further superior in the advantages of suppression of light leak and prevention of brightness irregularity. Further, the liquid crystal panel in the liquid crystal display of the present invention is preferably a liquid crystal panel having the polarizing plate of the present invention on the backlight side. For example, the liquid crystal panel 100 shown in FIG. 5 can be replaced by the liquid crystal panel 30 shown in FIG. 2 or the liquid crystal panel 40 shown in FIG. 3. FIG. 6 shows an example of the structure of such a liquid crystal display. A liquid crystal display 300 has the structure same as that of the liquid crystal display 200 shown in FIG. 5 except that the liquid crystal panel 100 is replaced by the liquid crystal panel 30 shown in FIG. 3. It is more preferable that the liquid crystal display of the present invention includes the liquid crystal panel in which the polarizing plate of the present invention is arranged on the back side of the visible side and further includes a backlight. When the liquid crystal display of the present invention has such a structure, the advantages of the present invention such as suppression of light leak and prevention of brightness irregularity can be further enhanced, and also superior viewing angle properties can be obtained. Further in this case, in the polarizing plate of the present invention arranged on the backlight side, when the optical compensation layer is arranged on the liquid crystal cell side, the aforementioned suppression of light leak, prevention of brightness irregularity, and viewing angle properties are further enhanced, and therefore particularly preferable.

The liquid crystal display of the present invention can be used for any appropriate applications. Examples of thereof include office equipment such as a PC monitor, a notebook PC, a copy machine, and the like; portable devices such as a mobile phone, a watch, a digital camera, a personal digital assistant (PDA), a handheld game machine, and the like; home electric appliances such as a video camera, a television set, a microwave oven, and the like; vehicle equipment such as a back monitor, a monitor for a car-navigation system, a car audio device, and the like; display equipment such as an information monitor for stores, and the like; security equipment such as a surveillance monitor, and the like; and nursing and medical equipment such as a monitor for nursing care, a monitor for medical use, and the like; and the like.

The preferable application of the liquid crystal display of the present invention is televisions. The screen size of the television is preferably a wide 17 type (373 mm×224 mm) or larger, more preferably a wide 23 type (499 mm×300 mm) or larger, and further preferably a wide 32 type (687 mm×412 mm) or larger.

EXAMPLE

Next, Examples of the present invention are described together with Comparative Examples. The present invention is neither limited nor restricted by the following Examples. Various properties and physical properties in the respective Examples and Comparative Examples were measured or evaluated by the following methods.

<Moisture Percentage of Polarizing Plate>

A moisture percentage of a polarizing plate was measured by the following method.

(1) Five samples of 10 cm×10 cm were taken from a polarizing plate in a width direction (a TD direction, i.e., a direction perpendicular to an absorption axis) at regular intervals. The weight of each sample was measured and was referred to as an initial sample weight (W0).

(2) Each of the samples was heat-treated by placing it to an oven ("CLEAN OVEN PVHC-211" (product name) produced by ESPEC Corp.) at 120° C. for 12 hours or longer. Thereafter, the weight of each sample right after taking out from the oven was measured and was referred to as a heat-treated sample weight (W1).

(3) The moisture percentage (% by mass) of each sample was calculated by the following formula (I) and the average value of the moisture percentages of the five samples was referred to as the moisture percentage of the polarizing plate.

$$\text{Moisture percentage (\% by mass)} = ((W0-W1)/W0) \times 100 \quad (I)$$

W0: initial sample weight
W1: heat-treated sample weight

<Strain of Polarizing Plate>

A strain of a polarizing plate was measured by the following method.

(1) An adhesive agent was applied to the surface of the polarizing plate of the present invention on the optical compensation layer side, and the polarizing plate was cut into a quarter size of a 32 inch liquid crystal panel (a longitudinal direction is an MD direction, i.e., an absorption axis direction) and was applied and mounted to the surface of a 32 inch liquid crystal panel of "BRAVIA" (product name) produced by Sony Corp.

(2) The surface of the mounted polarizing plate of the present invention on the transparent protective film side was rubbed with a tracing paper and the surface was roughened (surface roughness of from about 2 μm to about 4 μm). It is to be noted that this roughening was conducted in order to increase adhesiveness of the adhesive agent and the surface roughness was not strictly determined.

(3) A triaxial strain gauge (gauge type: FRA-5-11, produced by Tokyo Sokki Kenkyujo Co., Ltd.) was applied to the roughened surface of the polarizing plate using an adhesive agent such that they were completely adhered. On this occasion, measurement portions of four gauges of the strain gauge were applied to corners of a square of 10 cm×10 cm at the central part of the polarizing plate.

(4) The strain gauge was attached to a data logger produced by Tokyo Sokki Kenkyujo Co., Ltd. and the strain measurement mode was selected.

(5) The liquid crystal panel was fixed so as to stand erect using a tool at room temperature (20° C. to 25° C.), and then was placed in an oven ("CLEAN OVEN VHC-330" (product name) produced by ESPEC Corp.) at 50° C.±3° C.

(6) The time the liquid crystal panel was placed in the oven was regarded as 0 minutes, and the strain of the polarizing plate that was heated for 120 minutes was measured in the MD direction (an absorption axis direction of the polarizer) and the TD direction (a direction perpendicular to the absorption axis in a plane of the polarizing plate). The strain (ε) of the polarizing plate is a value calculated by the following formula (IV). It is to be noted that the following formula (IV) is substantially the same as the formula (III). Further, with respect to the MD direction and the TD direction, the change in the strain with the lapse of time from 0 minutes to 120 minutes was measured in the same manner as described above.

$$\varepsilon = \Delta L/L \quad (IV)$$

L: gauge length
ΔL: change in ΔL gauge length

<Black Brightness Ratio>

A black brightness ratio was measured as follows. That is, first, the liquid crystal display of the present invention was produced by the method described later. After 30 minutes from the lightning of the backlight, a black display was displayed and the maximum brightness and the minimum brightness were measured using a brightness distribution measurement apparatus ("CA-1500" (product name) produced by Konica Minolta Holdings, Inc.). Then, the maximum brightness value was divided by the minimum brightness value to calculate the black brightness ratio. That is, black brightness ratio=maximum brightness/minimum brightness. It is to be noted that, at the time of measuring the maximum brightness and the minimum brightness, a liquid crystal panel was divided into sixteen pieces (horizontal four sections×vertical four sections), and the lowest value of the black brightness in the central four sections was referred to as the minimum black brightness and the highest value of the black brightness in a plane of the liquid crystal panel was referred to as the maximum brightness.

<Thickness>

When the thickness is less than 10 μm, the thickness was measured using a spectrophotometer for thin film "MULTI CHANNEL PHOTO DETECTOR MCPD-2000" (product name) produced by Otsuka Electronics Co., Ltd. When the thickness is 10 μm or more, the thickness was measured using a digital micrometer "KC-351C type" produced by Anritsu Company.

<Transparent Protective Film>

Reference Example 1

A 80 μm-thick TAC film ("80 UL" (product name) produced by FUJIFILM Corporation) was provided as a transparent protective film.

<Polarizer>

Reference Example 2

75 μm-thick polymer films containing a polyvinyl alcohol resin as a main component ("VF-PS No. 7500" (product name) produced by Kuraray Co., Ltd.) were immersed in five bathes of the following conditions [1] to [5] while applying a tension in a longitudinal direction of the film. The films were stretched so that the final stretching ratio becomes 6.2-fold with respect to the original length of the films. These stretched films were dried in an air circulation oven at 40° C. for 1 minute to produce polarizers.

<Conditions>
[1] Swelling bath: pure water at 30° C.
[2] Staining bath: a solution at 30° C. containing 0.032 parts by weight of iodine and 0.2 parts by weight of potassium iodide relative to 100 parts by weight of water
[3] First cross-linking bath: a solution at 40° C. containing 3% by mass of potassium iodide and 3% by mass of boric acid
[4] Second cross-linking bath: a solution at 60° C. containing 5% by mass of potassium iodide and 4% by mass of boric acid
[5] Water washing bath: a solution at 25° C. containing 3% by mass of potassium iodide
<Optical Compensation Layer>

Reference Example 3

A 100 μm-thick polymer film containing a norbornene resin ("ARTON" (product name) produced by JSR Corporation) was stretched 2.8-fold by a fixed end horizontal uniaxial stretching method (method of stretching in a width direction while fixing a longitudinal direction) using a tenter stretching machine in an air circulation isothermal oven at 155° C. to produce an optical compensation layer AR 1. With respect to this first optical compensation layer AR 1, the refractive index showed the relation of nx>ny>nz, the thickness was 45 μm, T[590]=90%, Re[590]=45 nm, Rth [590]=280 nm, and Nz coefficient=6.2 at the wavelength of 590 nm.
<Polarizing Plate>

Example 1

The optical compensation layer AR 1 of Reference Example 3 was applied to the one side of the polarizer of Reference Example 2 via a water-soluble adhesive agent containing a polyvinyl alcohol resin ("GOHSEFIMER Z 200" (product name) produced by Nippon Synthetic Chemical Industry Co., Ltd.) in such a manner that a slow axis of the optical compensation layer AR 1 and an absorption axis of the polarizer were orthogonally aligned. Then, the transparent protective film of Reference Example 1 was applied on the other side of the polarizer via the water-soluble adhesive agent. The thus obtained laminate was dried in an oven (produced by OKAZAKI MACHINERY CO., LTD) at 60° C. to 90° C. for 5 minutes.

After drying, the laminate was passed through an oven (produced by OKAZAKI MACHINERY CO., LTD) at 75° C. for 3 minutes to perform a heat treatment (annealing treatment). In this manner, the polarizing plate of the present invention was produced.

Example 2

The polarizing plate of Example 2 was produced in the same manner as in Example 1 except that the heat treatment (annealing treatment) time (time for passing through the oven) was changed from 3 minutes to 10 minutes.

Example 3

The polarizing plate of Example 3 was produced in the same manner as in Example 1 except that the heat treatment (annealing treatment) time (time for passing through the oven) was changed from 3 minutes to 20 minutes.

Comparative Example 1

The polarizing plate of Comparative Example 1 was produced in the same manner as in Example 1 except that the heat treatment (annealing treatment) time (time for passing through the oven) was changed from 3 minutes to 1 minute.

Comparative Example 2

The polarizing plate of Comparative Example 2 was produced in the same manner as in Example 1 except that the heat treatment (annealing treatment) was not conducted.
<Liquid Crystal Panel>

Example 1-2

An adhesive agent was applied to the polarizing plate of Example 1 on the optical compensation layer side, and the polarizing plate was cut into the size same as the 32 inch liquid crystal panel (an MD direction i.e., an absorption axis direction is a long side direction) and was applied and mounted to the backlight side (the back side of the visible side) of the 32 inch liquid crystal panel of "BRAVIA" (product name) produced by Sony Corp. On the visible side of the liquid crystal panel, a polarizing plate in which transparent protective films made from triacetyl cellulose (TAC) were applied to the both sides of the polarizer was mounted by an adhesive coating. As for this polarizing plate, a polarizing plate that was cut into the size same as the 32 inch liquid crystal panel (an MD direction i.e., an absorption axis direction is a short side direction) was used. In this manner, the liquid crystal panel of the present invention was produced.

Example 2-2

The liquid crystal panel of Example 2-2 was produced in the same manner as in Example 1-2 except that the polarizing plate of Example 1 was replaced by the polarizing plate of Example 2.

Example 3-2

The liquid crystal panel of Example 3-2 was produced in the same manner as in Example 1-2 except that the polarizing plate of Example 1 was replaced by the polarizing plate of Example 3.

Comparative Example 1-2

The liquid crystal panel of Comparative Example 1-2 was produced in the same manner as in Example 1-2 except that the polarizing plate of Example 1 was replaced by the polarizing plate of Comparative Example 1.

Comparative Example 2-2

The liquid crystal panel of Comparative Example 2-2 was produced in the same manner as in Example 1-2 except that the polarizing plate of Example 1 was replaced by the polarizing plate of Comparative Example 2.
<Liquid Crystal Display>

Example 1-3

The liquid crystal display of Example 1-3 was produced by arranging a backlight ("BRAVIA S2500" (product name) produced by Sony Corp.) on the back side of the visible side (on the side to which the polarizing plate of Example 1 was mounted) of the liquid crystal panel of Example 1-2

Example 2-3

The liquid crystal display of Example 2-3 was produced in the same manner as in Example 1-3 except that the liquid crystal panel of Example 1-2 was replaced by the liquid crystal panel of Example 2-2.

Example 3-3

The liquid crystal display of Example 3-3 was produced in the same manner as in Example 1-3 except that the liquid crystal panel of Example 1-2 was replaced by the liquid crystal panel of Example 3-2.

Comparative Example 1-3

The liquid crystal display of Comparative Example 1-3 was produced in the same manner as in Example 1-3 except that the liquid crystal panel of Example 1-2 was replaced by the liquid crystal panel of Comparative Example 1-2.

Comparative Example 2-3

The liquid crystal display of Comparative Example 2-3 was produced in the same manner as in Example 1-3 except that the liquid crystal panel of Example 1-2 was replaced by the liquid crystal panel of Comparative Example 2-2.

With respect to the polarizing plates of Examples 1 to 3 and Comparative Examples 1 to 2 produced as described above, the moisture percentage, the strain in the MD direction, and the strain in the TD direction were measured by the aforementioned methods. Further, with respect to the liquid crystal displays of Examples 1-3 to 3-3 and Comparative Examples 1-3 to 2-3 to which the aforementioned polarizing plates were mounted, the black brightness ratio was measured by the aforementioned method. The results thereof are summarized in the following Table 1. In Table 1, the strain in the MD direction and the strain in the TD direction each are the strain after 120 minutes from the heating. In Table 1, "$\mu\epsilon$" means $1.00\times10^{-6}\epsilon$. That is, for example, 240 $\mu\epsilon$ means $240\times10^{-6}\epsilon$. Further, with respect to the black brightness ratios in Table 1, although they are the evaluations for Examples for the liquid crystal display as described above, they are indicated by the Example numbers according to the polarizing plate mounted to the liquid crystal displays.

TABLE 1

|  | Annealing condition | Moisture percentage (% by mass) | MD strain ($\mu\epsilon$) | TD strain ($\mu\epsilon$) | Black brightness ratio |
|---|---|---|---|---|---|
| Ex. 1 | 75° C. × 3 min | 2.665 | 355 | 687 | 1.807 |
| Ex. 2 | 75° C. × 10 min | 2.499 | 264 | 608 | 1.491 |
| Ex. 3 | 75° C. × 20 min | 2.202 | 240 | 596 | 1.239 |
| Comp. Ex. 1 | 75° C. × 1 min | 2.814 | 418 | 871 | 2.108 |
| Comp. Ex. 2 | Untreated | 3.046 | 434 | 926 | 2.408 |

Figure 7A:
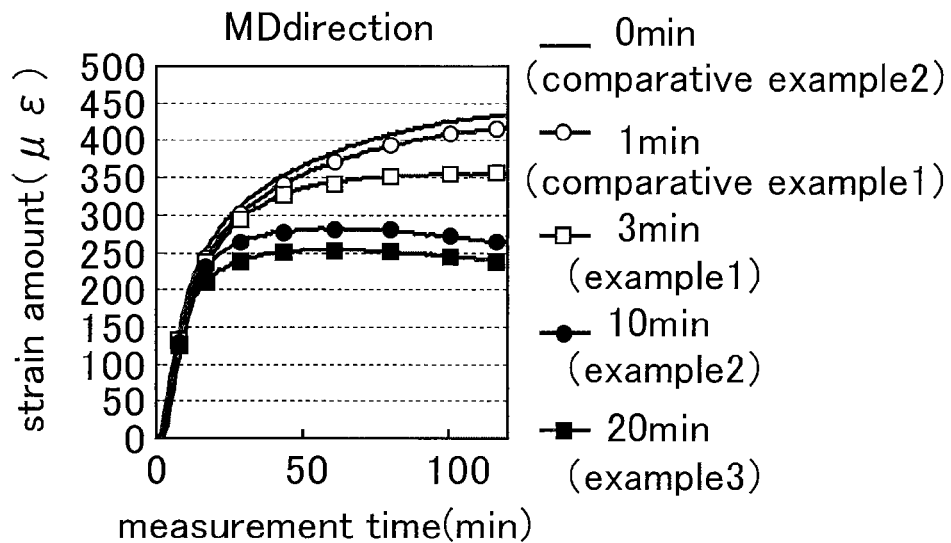
FIGS. 7A and 7B are graphs showing changes in strains of polarizing plates in a MD direction and a TD direction with the lapse of time in Examples of the present invention.
Figure 7B:
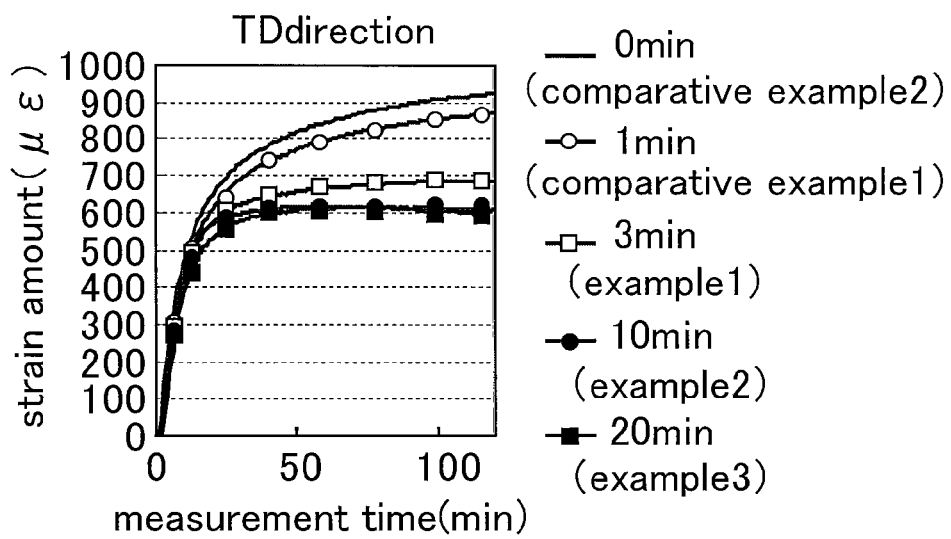

Further, the change in the strain in the MD direction with the lapse of time and the change in the strain in the TD direction with the lapse of time are shown in FIGS. 7A and 7B. FIG. 7A is a graph showing the strain in the MD direction and FIG. 7B is a graph showing the strain in the TD direction. In FIGS. 7A and 7B, the vertical axis indicates the strain amount ($\mu\epsilon$) and the horizontal axis indicates the measurement time. The meaning of "$\mu\epsilon$" is as same as that in Table 1. Further, the numeric values such as "0 min", "1 min", and the like in FIG. 7 indicate the time for the annealing treatment at the time of producing the polarizing plate.

As shown in FIG. 7 and Table 1, with respect to the polarizing plates of Examples having the moisture percentage of 2.8% by mass or less, the strain was small. Therefore, as summarized in Table 1, with respect to the polarizing plates of Examples, the black brightness ratio was 2.0 or less and the light leak and the brightness irregularity were prevented. In contrast, with respect to the polarizing plates of Comparative Examples, the strain was large, the numeric value of the black brightness ratio was large, and the light leak and the brightness irregularity were not prevented sufficiently.

Industrial Applicability

As described above, according to the present invention, a polarizing plate, a liquid crystal panel, and a liquid crystal display that keep the light leak therefrom at a low level and prevents occurrence of even just a little bit of brightness irregularity can be provided. Examples of the applications of the polarizing plate, the liquid crystal panel, and the liquid crystal display of the present invention include office equipment such as a desktop PC, a notebook PC, a copy machine, and the like; portable devices such as a mobile phone, a watch, a digital camera, a personal digital assistant (PDA), a handheld game machine, and the like; home electric appliances such as a video camera, a television set, a microwave oven, and the like; vehicle equipment such as a back monitor, a monitor for a car-navigation system, a car audio device, and the like; display equipment such as an information monitor for stores, and the like; security equipment such as a surveillance monitor, and the like; nursing and medical equipment such as a monitor for nursing care and a monitor for medical use, and the like; and the like. The applications are not limited thereto and can be applied to a wide range of fields.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

Reference Signs List

10, 20 polarizing plate
11, 21 transparent protective film
12, 22 polarizer
13, 23 optical compensation layer
30, 40, 100 liquid crystal panel
41 liquid crystal cell
411a, 411b substrate
412 spacer
413 liquid crystal layer
80 backlight unit
81 light source
82 reflection film
83 diffusion plate
84 prism sheet
85 brightness enhancement film
200, 300 liquid crystal display

What is claimed is:

1. A polarizing plate comprising;
a transparent protective film;
a polarizer; and
an optical compensation layer, wherein
the transparent protective film, the polarizer, and the optical compensation layer are laminated in this order,
a moisture percentage of the polarizing plate is 2.8% by mass or less, the optical compensation layer comprises a retardation film, the retardation film contains at least one resin selected from the group consisting of norbornene resins, cellulose resins, polyvinyl acetal resins, polyimide resins, polyester resins, and polycarbonate resins, and the optical compensation layer shows an optical property represented by the following formula (I);

$$nx>ny>nz \quad (I)$$

where in the formula (I), nx, ny, and nz show refractive indices in an X-axis direction, a Y-axis direction, and a Z-axis direction respectively in the optical compensation layer, the X-axis direction is an axial direction that shows a maximum refractive index in a plane of the optical compensation layer, the Y-axis direction is an axial direction that is perpendicular to the X-axis direction in the plane, and the Z-axis direction is a thickness direction that is perpendicular to the X-axis direction and the Y-axis direction.

2. The polarizing plate according to claim 1, wherein the moisture percentage of the polarizing plate is 2.5% by mass or less.

3. The polarizing plate according to claim 1, wherein the moisture percentage of the polarizing plate is 2.3% by mass or less.

4. The polarizing plate according to claim 1, wherein an Nz coefficient of the optical compensation layer represented by the following formula (II) is 1.5 or more at the wavelength of $\lambda=590$ nm:

$$Nz=(nx-nz)/(nx-ny) \quad (II)$$

where in the formula (II), nx, ny, and nz are the same as in the formula (I).

5. The polarizing plate according to claim 1, wherein the transparent protective film is a triacetyl cellulose film.

6. The polarizing plate according to claim 1, wherein after conducting a heat treatment to the polarizing plate at 50° C.±3° C. for 120 minutes, a strain $\epsilon$ of the polarizing plate represented by the following formula (III) in a direction of an absorption axis of the polarizer is $400\times10^{-6}$ or less and the strain $\epsilon$ of the polarizing plate in a direction perpendicular to the absorption axis in a plane of the polarizing plate is $800\times10^{-6}$ or less:

$$\epsilon=\Delta L/L \quad (III)$$

where in the formula (III), L is a dimension (mm) in a measurement direction of the strain of the polarizing plate before the heat treatment, and $\Delta L$ is an absolute value of an amount of change in the dimension (mm) in the measurement direction of the strain before and after the heat treatment.

7. The polarizing plate according to claim 6, wherein the strain $\epsilon$ of the polarizing plate in the direction of the absorption axis of the polarizer is $370\times10^{-6}$ or less and the strain $\epsilon$ of the polarizing plate in the direction perpendicular to the absorption axis in the plane of the polarizing plate is $700\times10^{-6}$ or less.

8. The polarizing plate according to claim 6, wherein the strain $\epsilon$ of the polarizing plate in the direction of the absorption axis of the polarizer is $270\times10^{-6}$ or less and the strain $\epsilon$ of the polarizing plate in the direction perpendicular to the absorption axis in the plane of the polarizing plate is $620\times10^{-6}$ or less.

9. The polarizing plate according to claim 6, wherein the strain $\epsilon$ of the polarizing plate in the direction of the absorption axis of the polarizer is $250\times10^{-6}$ or less and the strain $\epsilon$ of the polarizing plate in the direction perpendicular to the absorption axis in the plane of the polarizing plate is $600\times10^{-6}$ or less.

10. A liquid crystal panel comprising:
a liquid crystal cell; and
the polarizing plate according to claim 1, wherein
the polarizing plate is arranged on at least one side of the liquid crystal cell.

11. The liquid crystal panel according to claim 10, wherein the liquid crystal cell is a VA mode liquid crystal cell, and the VA mode liquid crystal cell has liquid crystal molecules aligned in a homeotropic alignment in the absence of an electric field.

12. The liquid crystal panel according to claim 10, wherein the polarizing plate is arranged on at least a back side of a visible side of the liquid crystal cell.

13. The liquid crystal panel according to claim 12, wherein the polarizing plate arranged on the back side of the visible side of the liquid crystal cell, the optical compensation layer is arranged on a liquid crystal cell side.

14. The liquid crystal panel according to claim 11, wherein the polarizing plate is arranged on at least a back side of a visible side of the liquid crystal cell.

15. The liquid crystal panel according to claim 14, wherein the polarizing plate arranged on the back side of the visible side of the liquid crystal cell, the optical compensation layer is arranged on a liquid crystal cell side.

16. A liquid crystal display comprising the polarizing plate according to claim 1.

17. A liquid crystal display comprising the liquid crystal panel according to claim 14 and a backlight arranged on the back side of the visible side of the liquid crystal cell.

18. A liquid crystal display comprising the liquid crystal panel according to claim 10.

* * * * *